(12) United States Patent
Zerenner et al.

(10) Patent No.: US 7,797,215 B1
(45) Date of Patent: Sep. 14, 2010

(54) SYSTEM AND METHOD FOR ANALYZING AND SEARCHING FINANCIAL INSTRUMENT DATA

(75) Inventors: Ernest H. Zerenner, Wilmington, DE (US); Gilbert A. Segal, Hockessin, DE (US); Gregory James Zerenner, Newark, DE (US)

(73) Assignee: Power Financial Group, Inc., Wilmington, DE (US)

( * ) Notice: Subject to any disclaimer, the term of this patent is extended or adjusted under 35 U.S.C. 154(b) by 1371 days.

(21) Appl. No.: 10/607,418

(22) Filed: Jun. 26, 2003

Related U.S. Application Data

(60) Provisional application No. 60/391,219, filed on Jun. 26, 2002.

(51) Int. Cl.
*G06Q 40/00* (2006.01)
(52) U.S. Cl. .......................................... 705/36; 705/35
(58) Field of Classification Search ................... 705/35, 705/36 R
See application file for complete search history.

(56) References Cited

U.S. PATENT DOCUMENTS

| | | | |
|---|---|---|---|
| 4,209,845 A | 6/1980 | Berger et al. ................. | 364/900 |
| 4,334,270 A | 6/1982 | Towers ........................ | 364/300 |
| 4,566,066 A | 1/1986 | Towers | |
| 4,611,280 A | 9/1986 | Linderman ................... | 364/300 |
| 4,648,037 A | 3/1987 | Valentino | |
| 4,674,044 A | 6/1987 | Kalmus et al. ............... | 364/408 |
| 4,774,666 A | 9/1988 | Miyao et al. ................. | 364/419 |
| 4,823,265 A | 9/1988 | Nelson ........................ | 364/408 |
| 4,846,687 A | 7/1989 | White et al. ................. | 434/112 |
| 4,870,610 A | 9/1989 | Belfer ......................... | 364/900 |
| 4,878,843 A | 11/1989 | Kuch .......................... | 434/112 |
| 4,961,139 A | 10/1990 | Hong et al. | |
| 4,989,141 A | 1/1991 | Lyons et al. | |
| 5,101,353 A | 3/1992 | Lupien et al. | |
| 5,161,103 A | 11/1992 | Kosaka et al. | |
| 5,169,342 A | 12/1992 | Steele et al. ................. | 434/112 |
| 5,189,056 A | 2/1993 | Orlando et al. | |
| 5,193,056 A | 3/1993 | Boes | |
| 5,218,700 A | 6/1993 | Beechick ................. | 395/259.2 |

(Continued)

FOREIGN PATENT DOCUMENTS

GB 2161003 1/1986

(Continued)

OTHER PUBLICATIONS www.poweropt.com, PowerOptions, Oct. 12, 1999 and Jun. 6, 2002, web.archive.org (Wayback Machine), pp. 1-9.*

(Continued)

*Primary Examiner*—Jagdish N. Patel
*Assistant Examiner*—Kenneth Bartley
(74) *Attorney, Agent, or Firm*—Woodcock Washburn LLP

(57) ABSTRACT

Exemplary systems and methods for analyzing and searching financial instrument data respond to user defined searches using updated financial market data. Potential returns from different investment strategies can be viewed together so that the returns and risks can be compared and contrasted. The effect on various option strategies of a change in the price of the underlying stock can be analyzed. Potential investment opportunities relating to an existing investment position can be identified. Stock repair opportunities relating to a selected stock investment can be identified and implemented.

21 Claims, 25 Drawing Sheets

U.S. PATENT DOCUMENTS

| | | | |
|---|---|---|---|
| 5,220,500 A | 6/1993 | Baird et al. | |
| 5,257,938 A | 6/1993 | Tein | 434/128 |
| 5,247,575 A | 9/1993 | Sprague et al. | |
| 5,260,999 A | 11/1993 | Wyman | 384/4 |
| 5,262,942 A | 11/1993 | Earle | 364/408 |
| 5,270,922 A | 12/1993 | Higgins | 364/408 |
| 5,297,031 A | 3/1994 | Gutterman et al. | 364/408 |
| 5,297,032 A | 3/1994 | Trojan et al. | |
| 5,302,132 A | 4/1994 | Corder | 434/156 |
| 5,347,452 A | 9/1994 | Bay, Jr. | 364/408 |
| 5,349,368 A | 9/1994 | Takeda et al. | 345/115 |
| 5,414,838 A | 5/1995 | Kolton et al. | 395/600 |
| 5,497,317 A | 3/1996 | Hawkins et al. | |
| 5,502,637 A | 3/1996 | Beaulieu et al. | |
| 5,537,618 A | 7/1996 | Boulton et al. | 395/161 |
| 5,544,281 A | 8/1996 | Maruoka et al. | 395/68 |
| 5,590,325 A | 12/1996 | Kolton et al. | |
| 5,594,910 A | 1/1997 | Filepp et al. | |
| 5,630,123 A | 5/1997 | Hogge | 395/607 |
| 5,644,727 A | 7/1997 | Atkins | |
| 5,675,746 A | 10/1997 | Marshall | |
| 5,741,136 A | 4/1998 | Kirksey et al. | 434/169 |
| 5,749,077 A | 5/1998 | Campbell | |
| 5,754,939 A | 5/1998 | Herz et al. | 455/4.2 |
| 5,761,661 A | 6/1998 | Coussens et al. | 707/9 |
| 5,784,696 A | 7/1998 | Melnikoff | 705/36 |
| 5,809,483 A | 9/1998 | Broka et al. | 705/37 |
| 5,854,997 A | 12/1998 | Sukeda et al. | 704/3 |
| 5,862,223 A | 1/1999 | Walker et al. | 380/25 |
| 5,862,325 A | 1/1999 | Reed et al. | 395/200.31 |
| 5,864,871 A | 1/1999 | Kitain et al. | 707/104 |
| 5,893,079 A | 4/1999 | Cwenar | 705/36 |
| 5,911,136 A | 6/1999 | Atkins | 705/36 |
| 5,913,202 A | 6/1999 | Motoyama | 705/35 |
| 5,918,217 A | 6/1999 | Maggioncalda et al. | 705/36 |
| 5,978,778 A | 11/1999 | O'Shaughnessy | 705/36 |
| 6,012,042 A | 1/2000 | Black et al. | 705/36 |
| 6,021,397 A | 2/2000 | Jones et al. | 705/36 |
| 6,049,783 A | 4/2000 | Seagal et al. | 705/37 |
| 6,058,378 A | 5/2000 | Clark et al. | 705/37 |
| 6,064,985 A * | 5/2000 | Anderson | 705/36 R |
| 6,078,924 A * | 6/2000 | Ainsbury et al. | 707/101 |
| 6,226,623 B1 | 5/2001 | Schein et al. | |
| 6,317,726 B1 | 11/2001 | O'Shaughnessy | 705/36 |
| 6,321,212 B1 | 11/2001 | Lange | 705/37 |
| 6,839,686 B1 * | 1/2005 | Galant | 705/36 R |
| 7,165,042 B1 | 1/2007 | Segal et al. | |
| 7,212,997 B1 * | 5/2007 | Pine et al | 705/36 R |
| 2001/0056392 A1 | 12/2001 | Daughtery, III | 705/36 |
| 2003/0028468 A1 | 2/2003 | Wong et al. | |
| 2003/0069821 A1 | 4/2003 | Williams | |
| 2003/0139993 A1 | 7/2003 | Feuerverger | |
| 2004/0068457 A1 | 4/2004 | Tao et al. | |
| 2004/0267657 A1 | 12/2004 | Hecht | |
| 2005/0015449 A1 | 1/2005 | Klos et al. | |
| 2005/0075962 A1 | 4/2005 | Dunne | |
| 2005/0108148 A1 | 5/2005 | Carlson | |
| 2005/0216390 A1 | 9/2005 | Snider et al. | |
| 2006/0080193 A1 | 4/2006 | McMurtray et al. | |

FOREIGN PATENT DOCUMENTS

| | | |
|---|---|---|
| GB | 2210714 | 6/1989 |
| WO | WO 97/42591 | 11/1997 |
| WO | WO 98/09229 | 3/1998 |

OTHER PUBLICATIONS

Evan Thomas, PowerOptionsPlus, Feb. 2002, 31, 3, pp. 56-57.*
PowerOptions Plus.Com. "The Best Way to Find, Compare, Analyze, and make Money on Option Investments", Home Page, http://www.poweropt.com/ourcompany.asp, © 1997-2002, 1 page.
OptionFind.com, www.optionfind.com, © 1998 Productivity Systems, 3 pages.
OptionsNewsletter: Stock Options made Easy, http://www.optionsnewsletter.com, © QuoteMedia, 18 pages.
E*Trade-research from Investors, www.etrade.com, © 1997 E*Trade Securities, 7 pages.
INVESTools-Trusted Advice for Independent Investors, www.investools.com, © 2000, 4 pages.
Yahoo!Finance, www.yahoo.com, © 2000, 2 pages.
Hoovers Online, The Business Network, www.hoovers.com, 2000, 1 page.
Covered Call Screening www.investorsmind.com, © 1996-2000 Investorsmind.com, 2 pages.
OptionsXpress-Option Screener, www.optionsxpress.com, ®2000, 1 pages.
Merrill Lynch—www.newmlol.com, © 2001,15 pages.
Your Finance Resource, www.investmentdiscovery.com, 2006, 2 pages.
www.optionsearcher.com, © 2001-2006 OptionSearcher.com, 5 pages.
Optionetics.com: An Investment Education Resource for Stock and Options Traders, www.optionetics.com, © 1995-2006, 19 pages.
OptionMonitor, Your Source for Covered Call Option Data and Analysis, www.optionmonitor.com, © 2001-2006 Option Review, Inc., 10 pages.
www.msn.com, Home p., 2006 © Microsoft, 13 pages.
Financial Planning and Small Business Software for Individuals—Official Quicken Site, http://quicken.intuit.com, © 2006 Intuit, Inc., 10 pages.
Carey, T.W., "Calls of the Mild", *Barron's Technology Week,* Apr. 29, 2002, 1 page.
OptionFind.com, www.optionfind.com, Feb. 24, 2000, 6 pages.
OptionsXpress-Option Screener, www.optionsxpress.com, Oct. 3, 2005, 4 pages.
AIQ Systems, The World Leader in Imtelligent Trading Software, http://www.aiqsystems.com, Home p., 3 pages.
Evan, T., "Power Options Plus", Feb. 2002, 31(3), 56-57.
PowerOptions Plus.Com, The Best Way to Find, Compare, Analyze, and make Money on Option Investments, www.poweropt.com, 1997-2002, 1 page.
In the United States Patent and Trademark Office, Non-Final Office Action in re:. U.S. Appl. No. 09/676,374, filed Sep. 29, 2000, Dated Jul. 5, 2007, 4 pages.
In the United States Patent and Trademark Office, Non-Final Office Action in re:. U.S. Appl. No. 09/676,374, filed Sep. 29, 2000, Dated Sep. 29, 2000, 4 pages.
In the United States Patent and Trademark Office, Final Office Action in re:. U.S. Appl. No:. 09/676,374, filed Sep. 29, 2000, Dated Nov. 22, 2005, 5 pages.
In the United States Patent and Trademark Office, Non-Final Office Action in re:. U.S. Appl. No. 09/676,374, filed Sep. 29, 2000, Dated Dec. 1, 2004, 16 pages.
In the United States Patent and Trademark Office, Non-Final Office Action in re:. U.S. Appl. No. 11/243,216, filed Oct. 4, 2005, Dated Mar. 11, 2008, 23 pages.
In the United States Patent and Trademark Office, in re.: U.S. Appl. No. 11/611,043 filed Dec. 14, 2006, Non-Final Office Action dated Feb. 4, 2009, 6 pages.
In the United States Patent and Trademark Office, in re.: U.S. Appl. No. 09/676,374 filed Sep. 29, 2000, Non-Final Office Action dated May 26, 2009, 5 pages.
In the United States Patent and Trademark Office, in re.: U.S. Appl. No. 09/676,374 filed Sep. 29, 2000, Final Office Action dated Nov. 22, 2005, 5 pages.
In the United States Patent and Trademark Office, in re.: U.S. Appl. No. 09/676,374 filed Sep. 29, 2000, Non-Final Office Action dated Jan. 16, 2007, 4 pages.
In the United States Patent and Trademark Office, in re.: U.S. Appl. No. 11/820,952 filed Jun. 21, 2007, Non-Final Office Action dated Oct. 5, 2009, 8 pages.
Telescan Inc. (Stock analysis Software) (1995 Guide to Computerized Trading), Futures (Cedar Falls, Iowa), Jul. 1995, 3 pages.

"Telescan launches Internet's First Complete Real-Time Information and Analysis Service for the Financial Markets", PR Newswire, Apr. 5, 1995, 3 pages.

"Telescan, Inc. launches ProSearch 5.0: Fast Stock Screening Software Program Targets All Investors", Business Wire, Jun. 6, 1996, 3 pages.

Barboza, "Reading the Tea Leaves Via Stock Analysis Software", New York Times, Sep. 21, 1997, 2 pages.

Gianturco, "Investment Software: Broker in a Box", Forbes, Inc., Apr. 8, 1996, 3 pages.

Gianturco, "Using Your PC to Pick the Best Fund Finder. (Steele Systems' Mutual Fund expert, Telescan's Mutual Fund Search, Value Line Publishing's Value Line Fund Analyzer and Morningstar's Ascent, Principia and Principia Plus fund-picking programs) (Forbes ASAP) (Software Review) (Evaluation)", Forbes, Oct. 1996, 5 pages.

http://web.archive.org/web/19991110210901/telescan.com/telescan_prod_ prolerts.htm Telescan, ProSearch Alerts, Accessed May 5, 2010.

http://web.archive.org/web/20000309144734/telescan.com/telescan_prod_procrit.htm Telescan, ProSearch Alerts, Accessed May 5, 2010.

Kawamoto, "On the Street . . . Online", New & Noteworthy, Jan. 1996, 2 pages.

Yakal, "Personal Investment Software, Investment 101", PC Magazine, Nov. 19, 1996, 9 pages.

"Data Broadcasting Corporation Unveils Multiple-User Real-Time Stock Market Investment Tool", PR Newswire, Apr. 8, 1997, 2 pages.

"Equity Research/Portfolio Analytics Support", Wall Street & Technology, (no month available) 1993, 136, Abstract.

"Faster Access to Newly Released Research via Investext", Information Today, Mar. 1993, 5(1).

"First Call Notes to be Available on Fidelity's MAXXESS & MAXXnet", Business Wire, Jun. 1997, 2 pages.

"Hoovers, Inc. Introduces StockScreener Free World Wide Web Service for Investors", Information Today, Sep. 1997, 45(1).

"IBM InfoSage Web-Based Service Debuts", Information Today, (no month available) 1996, 3 pages.

"On the Street Online, New & Noteworthy", Jan. 1996, 28-30.

"R.R. Donnelley Financial and IPO Crossroads Launch Highly Searchable IPO Database Website", PR Newswire, Dec. 1996, 1204, 4 pages.

"Telescan, Inc. Launches Internet's First Complete Real-Time Information and Analysis Service for the Financial Markets", PR Newswire, Apr. 1995, 405NY036.

"Telescan, Inc. Launches ProSearch 5.0: Fast Stock Screening Software Program Targets All Investors", Business Wire, Jun. 1996, 6060617.

"Telescan, Inc.", Futures, Jul. 1995, 46.

"ZDNet Introduces Inter@active Investor, Web's Most Comprehensive Source of Financial News and Information on Tech Companies", PR Newswire, Feb. 1998, 202.

Armstrong, "Navigate the Networks Like a Wall Street Pro", Business Week, Oct. 2004, 224, Abstract.

Carey, "Fidelity On-Line Express", PC Magazine, Jan. 1995, 14(1), 204(1), Abstract.

Cronin, "Is Giving Away Data a Smart Way to Profit?", Fortune, Dec. 1997, 258, Abstract.

Cullen, "Investing the High Tech Way (On-Line Products for Investors)", High Technology, Jun. 1987, 68, Abstract.

Dreyfuss, "How to Invest with Your PC", Fortune, Oct. 1990, 211(3).

Foust, "Screening Stocks on Your PC Screen", Business Week, Oct. 1993, 142(2), Abstract.

Gold, "Profile Increases Range of Online Service", Newsbytes, Jun. 1990.

Grinder, "An Overview of Financial Services Resources on the Internet", Financial Services Review, (no month available) 1997, 6(2), 125-140.

Kan, "Street Smart 1.0", MacWorld, Feb. 1995, 59, Abstract.

Moad, "Sabre Rattled", PC Week Executive, Jan. 29, 1996, E1-E2.

Ojala, "The Dollar Sign", http://www.onlineinc.com/database, Aug./Sep. 1996, Database, 82-88.

Price-Evans, "Investment Software: Plotting a Course on Supercharts", Investors Chronicle, Feb. 3, 1995.

Retkwa, "Financial Pages: You Can Now Obtain Investment Intelligence That Rivals That of Professional Traders", Internetworld, Feb. 1996, 66(6), Abstract.

Rosen, "Fitting the Plan to the Person", The New York Times, Nov. 16, 1986, Section 12, p. 40, col. 1.

Sahgal, "OLTP Spells Success in Time-Pressed '90s", Wall Street Computer Review, Jan. 1990, S42, Abstract.

Stern, "Trade in Your Old Way of Investing: With These Electronic Tools You Can Bring the Hottest Market Data Home Quickly", Home Office Computing, Jul. 1993, 62, Abstract.

Weiner, "Software Packages for Investors", Fortune, (no month available) 1986, 114, 185(3).

U.S. Appl. No. 09/676,374, Notice of Allowance Dated Feb. 18, 2010, 7 pages.

U.S. Appl. No. 11/611,043, Final Rejection Dated Nov. 24, 2009, 7 pages.

* cited by examiner

Intl. Business Machines (IBM) $84.92

Stock Chart • Optionable Stocks in Industry • Option Chain • Company News • Company Profile • Opinion Indicators • Earnings Calendar
Income Statement • Balance Sheet • Insiders Report • Analyst Estimates • Cash Flow Statement • Return on Equity • ScoreCard

Covered Calls — Intl. Business Machines (IBM) $84.92 — Covered Call Strategy Help  Bullish

| More Info | Sell Option | Expire/ Strike | Option Bid | Option Volume | Open Interest | Downside Protection | % Return Assigned | Delta | % Prob. Above | Black-Scholes | B-S Ratio | Implied Volatility |
|---|---|---|---|---|---|---|---|---|---|---|---|---|
| ▶ | IBMGO | 03 JUL 75.0 | $ 10.10 | 78 | 4962 | 11.9 % | 0.2 % | 0.96 | 95.9 % | $ 10.03 | 1.01 | 0.25 |
| ▶ | IBMGP | 03 JUL 80.0 | $ 5.80 | 521 | 15850 | 6.8 % | 1.1 % | 0.81 | 79.8 % | $ 5.60 | 1.04 | 0.25 |
| ▶ | IBMGQ | 03 JUL 85.0 | $ 2.55 | 1845 | 26064 | 3.0 % | 3.2 % | 0.51 | 49.5 % | $ 2.39 | 1.07 | 0.27 |
| ▶ | IBMGR | 03 JUL 90.0 | $ 0.80 | 2466 | 44853 | 0.9 % | 7.0 % | 0.22 | 21.5 % | $ 0.74 | 1.09 | 0.26 |

Covered Puts — Intl. Business Machines (IBM) $84.92 — Covered Put Strategy Help  Bearish

| More Info | Sell Option | Expire/ Strike | Option Bid | Option Volume | Open Interest | Downside Protection | % Return Assigned | Delta | % Prob. Above | Black-Scholes | B-S Ratio | Implied Volatility |
|---|---|---|---|---|---|---|---|---|---|---|---|---|
| ▶ | IBMSO | 03 JUL 75.0 | $ 0.30 | 866 | 24326 | 0.4 % | 12.1 % | -0.04 | 92.3 % | $ 0.15 | 2.03 | 0.31 |
| ▶ | IBMSP | 03 JUL 80.0 | $ 0.95 | 1500 | 37715 | 1.1 % | 7.0 % | -0.19 | 77.1 % | $ 0.71 | 1.33 | 0.28 |
| ▶ | IBMSQ | 03 JUL 85.0 | $ 2.60 | 3546 | 35001 | 3.1 % | 3.1 % | -0.49 | 49.4 % | $ 2.50 | 1.04 | 0.25 |

Bear-Put Debit Spreads

Intl. Business Machines (IBM) $84.92

Bear-Put Debit Spread Strategy Help Bearish

| More Info | Sell Option | Month & Strike Price | Bid Price | Buy Option | Month & Strike Price | Ask Price | % Return | % Return Annual | Net Credit | Break Even |
|---|---|---|---|---|---|---|---|---|---|---|
| | IBMSN | 03 JUL 70.0 | $ 0.10 | IBMSO | 03 JUL 75.0 | $ 0.35 | 1,900.00 % | 23,914 % | $ -0.25 | $ 74.75 |
| | IBMSO | 03 JUL 75.0 | $ 0.30 | IBMSP | 03 JUL 80.0 | $ 1.05 | 566.67 % | 7,132 % | $ -0.75 | $ 79.25 |
| | IBMSP | 03 JUL 80.0 | $ 0.95 | IBMSQ | 03 JUL 85.0 | $ 2.75 | 177.78 % | 2,238 % | $ -1.80 | $ 83.20 |
| | IBMSQ | 03 JUL 85.0 | $ 2.60 | IBMSR | 03 JUL 90.0 | $ 6.00 | 47.06 % | 592 % | $ -3.40 | $ 86.60 |

Speculative Buy Calls

Intl. Business Machines (IBM) $84.92

Buying Call Strategy Help Speculative Bullish

| More Info | Buy Option | Expire/ Strike | Option Bid | Option Last | Option Ask | Option Volume | % Option Volume | Open Interest | Delta | % To Double | Black-Scholes | B-S Ratio | Implied Volatility |
|---|---|---|---|---|---|---|---|---|---|---|---|---|---|
| | IBMGO | 03 JUL 75.0 | $ 10.10 | $ 10.20 | $ 10.50 | 78 | 123 | 4962 | 0.96 | 12.4 % | $ 10.03 | 1.01 | 0.25 |
| | IBMGP | 03 JUL 80.0 | $ 5.80 | $ 5.90 | $ 6.10 | 521 | 123 | 15850 | 0.81 | 8.4 % | $ 5.60 | 1.04 | 0.25 |
| | IBMGQ | 03 JUL 85.0 | $ 2.55 | $ 2.60 | $ 2.75 | 1845 | 123 | 26064 | 0.51 | 4.4 % | $ 2.39 | 1.07 | 0.27 |
| | IBMGR | 03 JUL 90.0 | $ 0.80 | $ 0.80 | $ 0.90 | 2466 | 123 | 44853 | 0.22 | 3.1 % | $ 0.74 | 1.09 | 0.26 |

Speculative Buy Puts

Intl. Business Machines (IBM) $84.92

Buying Put Strategy Help Speculative Bearish

| More Info | Buy Option | Expire/ Strike | Option Bid | Option Last | Option Ask | Option Volume | % Option Volume | Open Interest | Delta | % To Double | Black-Scholes | B-S Ratio | Implied Volatility |
|---|---|---|---|---|---|---|---|---|---|---|---|---|---|
| | IBMSO | 03 JUL 75.0 | $ 0.30 | $ 0.35 | $ 0.35 | 866 | 123 | 24326 | -0.04 | 3.5 % | $ 0.15 | 2.03 | 0.31 |

Figure 13A

PowerOptions - Post Purchase Analysis Tools - Microsoft Internet Explorer

File  Edit  View  Favorites  Tools  Help

PowerOptions PLUS

Any questions? We are here to help!
Call our toll free support at 877-992-7971 or
international 302-992-7971, 9am - 5pm EST.

Location: Home > Tool Menu > Post Purchase Analysis Menu

Covered Call Purchase Analysis...

Enter the stock and option information from your Covered Call position below. Once you Submit, the Tool will return your follow-up and position management alternatives.

| Stock/Index Symbol | Your Cost/Share | Stock Commission | # Shares |
|---|---|---|---|
| SPLS | 18 | 14.00 | 1000 |

| Option Symbol | Option Premium | Option Commission |
|---|---|---|
| PLQID | 1.60 | 15.00 |

[Submit]

Liquidation Value...$1,902.00

You can sell to close your 1000 shares of Staples Inc. (SPLS) for $19.21 /shr. and buy to close the PLQID (03 SEP 20.0) for $0.85 /cont. This makes the liquidation value for this covered call position: $18,331.00. Since your original position value was $16,429.00, you can liquidate with a net profit of $1,902.00.

Expiration Value...$2,796.00

Since your PLQID (03 SEP 20.0) option is out-of-the-money, you are not yet obligated to deliver 1000 shares of Staples Inc. (SPLS). This makes the expiration value for this covered call position: $20,810.00. Your original position value was $18,014.00, this position could expire with a net profit of $2,796.00.

Roll Out Opportunities...

Here are some potential roll-out opportunities. These are not all opportunities, just a selection. These are based on a couple of selection criteria.

For in the money covered calls, your roll out opportunities shown are where the new option bid price is at least 70% of the buy-back price so that your roll will never cost you more than 30% of the buy-back. For out of the money covered calls, we only show options where the new option sell price will be at least 50% of the price you orininally got for the last option sale.

There are other roll opportunities if you consult the OptionChain Tool.

You could buy to close the PLQID (03 SEP 20.0) for $0.85 /cont and sell to open (write) one of the below calls...

| Option Sym | Expire/Strike & Days To Exp. | Opt Bid | Net Credit | % Dnsd. Prot. | % Assnd | Ann. % Dnsd. Prot. | Ann. % Assnd | Prob. Above |
|---|---|---|---|---|---|---|---|---|
| PLQFC | 03 JUN 15.0 (1) | $ 4.10 | $ 3.25 | 26.9 % | 12.4 % | -9,804.3 % | -4,540.8 % | 100.0 % |
| PLQFW | 03 JUN 17.5 (1) | $ 1.60 | $ 0.75 | 13.0 % | 10.6 % | -4,734.9 % | -3,882.8 % | 0.0 % |
| PLQGW | 03 JUL 17.5 (29) | $ 1.80 | $ 0.95 | 14.1 % | 11.9 % | 190.4 % | 161.4 % | 87.4 % |
| PLQIC | 03 SEP 15.0 (92) | $ 4.30 | $ 3.45 | 28.0 % | 14.0 % | 113.4 % | 56.7 % | 95.6 % |
| PLQIW | 03 SEP 17.5 (92) | $ 2.20 | $ 1.35 | 16.3 % | 14.6 % | 66.1 % | 59.3 % | 74.0 % |
| PLQLW | 03 DEC 17.5 (183) | $ 2.65 | $ 1.80 | 18.8 % | 17.8 % | 37.9 % | 35.9 % | 67.6 % |
| PLQLD | 03 DEC 20.0 (183) | $ 1.25 | $ 0.40 | 11.0 % | 22.6 % | 22.2 % | 45.7 % | 42.1 % |

Figure 13B

Bear-Put Debit Spread Post Purchase Analysis...

Enter the long and short option information from your Bear-Put Debit Spread position below. Once you Submit, the Tool will return your follow-up and position management alternatives.

| Expire/Strike | Long Option Symbol | Long Buy Price/Contract | Long Option Commission | # Cont. (each option) |
|---|---|---|---|---|
| (03 NOV 35.0) | LQNWG | 3.30 | 15.00 | 10 |

| | Short Option Symbol | Short Sell Price/Contract | Short Option Commission | |
|---|---|---|---|---|
| (03 NOV 32.5) | LQNWZ | 2.00 | 15.00 | Submit |

Liquidation loss... $60.00 | Liquidation Price...$1,240.00

You can sell to close your 10 contracts of LQNWG (03 NOV 35.0) for $4.70 /cont. and buy to close the LQNWZ (03 NOV 32.5) for $3.40 /cont. This makes the liquidation value for this Bear-Put Debit Spread position: $1,240.00. Your original expected profit was $1,140.00. Liquidating would leave you with a loss of $-60.00. Your original expected max risk was $-1,360.00.

Expiration Value...$1,140.00 (max. profit) | Underlying Price...$31.28

Since your LQNWZ (03 NOV 32.5) option is in-the-money, you may be obligated to buy 1000 shares of Lincare Holdings Inc. (LNCR) for $32.50 /shr. This makes the expiration value for this Bear-Put Debit Spread position: $1,140.00. Note: You must close both sides of the position before expiration to realize any potential profit and avoid the short put assignment.

Bear-Call Credit Spread Opportunities...

If you are interested in further hedging this position, or think that LNCR may be trading within a narrow range until expiration, you may want to consider trading a Bear-Call Credit Spread in addition to your current position...

| Sell Option | Expire/Strike & Days To Exp. | Bid Price | BS Ratio | Buy Option | Expire/Strike & Days To Exp. | Ask Price | BS Ratio | % Return | Net Credit | Max. Risk | Prob. Below |
|---|---|---|---|---|---|---|---|---|---|---|---|
| LQNKZ | 03 NOV 32.5 (153) | $2.00 | 0.88 | LQNKG | 03 NOV 35.0 (153) | $1.25 | 0.76 | 42.9 % | $0.75 | $1.75 | 57% |

Figure 13C

Bear-Call Credit Spread Post Purchase Analysis...

Enter the long and short option information from your Bear-Call Credit Spread position below. Once you Submit, the Tool will return your follow-up and position management alternatives.

|  | Expire/<br>Strike | Long Option<br>Symbol | Long Buy<br>Price/Contract | Long Option<br>Commission | # Cont.<br>(each option) |
|---|---|---|---|---|---|
|  | (03 OCT 55.0) | GQRJK | 2.90 | 15.00 | 10 |
|  |  | Short Option<br>Symbol | Short Sell<br>Price/Contract | Short Option<br>Commission |  |
|  | (03 OCT 50.0) | GQRJJ | 4.50 | 15.00 | Submit |

Liquidation profit... $420.00 | Liquidation Price...$-1,180.00

You can sell to close your 10 contracts of GQRJK (03 OCT 55.0) for $1.35 /cont. and buy to close the GQRJJ (03 OCT 50.0) for $2.50 /cont. This makes the liquidation value for this Bear-Call Credit Spread position: $-1,180.00. Your original expected profit was $1,570.00. Liquidating would leave you with a profit of $420.00. Your original expected max risk was $3,430.00.

Expiration Value...$1,570.00 (max. profit) | Underlying Price...$44.10

Since your GQRJJ (03 OCT 50.0) option is out-of-the-money, you are not yet obligated to buy 1000 shares of Garmin Ltd. (GRMN). Garmin Ltd. is currently trading at $44.10, as long as the stock price stays below $50.00, the expiration value for this spread position is the full expected profit of $1,570.00.

Condor Opportunities...

If you are interested in further hedging this position, or think that GRMN may be trading within a narrow range until expiration, you may want to consider trading a Bull-Put Credit Spread in addition to your current position...

| Sell<br>Option | Expire/Strike<br>& Days To Exp. | Bid<br>Price | BS<br>Ratio | Buy<br>Option | Expire/Strike<br>& Days To Exp. | Ask<br>Price | BS<br>Ratio | %<br>Return | Net<br>Credit | Max.<br>Risk | Prob.<br>Above |
|---|---|---|---|---|---|---|---|---|---|---|---|
| GQRVH | 03 OCT 40.0 (118) | $ 2.80 | 1.26 | GQRVG | 03 OCT 35.0 (118) | $ 1.50 | 1.68 | 35.1 % | $ 1.30 | $ 3.70 | 66.0% |
| GQRVG | 03 OCT 35.0 (118) | $ 1.35 | 1.68 | GQRVF | 03 OCT 30.0 (118) | $ 0.70 | 3.20 | 14.9 % | $ 0.65 | $ 4.35 | 83.5% |

Figure 13D

Bull-Put Credit Spread Post Purchase Analysis...

Enter the long and short option information from your Bull-Put Credit Spread position below. Once you Submit, the Tool will return your follow-up and position management alternatives.

|  | Expire/ Strike | Long Option Symbol | Long Buy Price/Contract | Long Option Commission | # Cont. (each option) |
|---|---|---|---|---|---|
|  | (03 OCT 70.0) | IBMVN | 2.25 | 15.00 | 10 |
|  |  | Short Option Symbol | Short Sell Price/Contract | Short Option Commission |  |
|  | (03 OCT 75.0) | IBMVO | 3.50 | 15.00 | Submit |

Liquidation profit... $270.00 | Liquidation Price...$-980.00

You can sell to close your 10 contracts of IBMVN (03 OCT 70.0) for $1.05 /cont. and buy to close the IBMVO (03 OCT 75.0) for $2.00 /cont. This makes the liquidation value for this Bull-Put Credit Spread position: $-980.00. Your original expected profit was $1,220.00. Liquidating would leave you with a profit of $270.00. Your original expected max risk was $-3,780.00.

Expiration Value...$1,220.00 (max. profit) | Underlying Price...$83.97

Since your IBMVO (03 OCT 75.0) option is out-of-the-money, you are not yet obligated to buy 1000 shares of Intl. Business Machines (IBM). Intl. Business Machines is currently trading at $83.97, as long as the stock price stays above $75.00, the expiration value for this spread position is the full expected profit of $1,220.00.

Condor Opportunities...

If you are interested in further hedging this position, or think that IBM may be trading within a narrow range until expiration, you may want to consider trading a Bear-Call Credit Spread in addition to your current position...

| Sell Option | Expire/Strike & Days To Exp. | Bid Price | BS Ratio | Buy Option | Expire/Strike & Days To Exp. | Ask Price | BS Ratio | % Return | Net Credit | Max. Risk | Prob. Below |
|---|---|---|---|---|---|---|---|---|---|---|---|
| IBMJA | 03 OCT 105.0 (114) | $ 0.25 | 0.76 | IBMJB | 03 OCT 110.0 (114) | $ 0.20 | 0.67 | 1.0 % | $ 0.05 | $ 4.95 | 94% |
| IBMJT | 03 OCT 100.0 (114) | $ 0.60 | 0.86 | IBMJA | 03 OCT 105.0 (114) | $ 0.35 | 0.76 | 5.3 % | $ 0.25 | $ 4.75 | 89% |
| IBMJS | 03 OCT 95.0 (114) | $ 1.25 | 0.93 | IBMJT | 03 OCT 100.0 (114) | $ 0.70 | 0.88 | 12.4 % | $ 0.55 | $ 4.45 | 81% |
| IBMJR | 03 OCT 90.0 (114) | $ 2.55 | 1.02 | IBMJS | 03 OCT 95.0 (114) | $ 1.35 | 0.93 | 31.6 % | $ 1.20 | $ 3.80 | 69% |
| IBMJQ | 03 OCT 85.0 (114) | $ 4.60 | 1.07 | IBMJR | 03 OCT 90.0 (114) | $ 2.70 | 1.02 | 61.3 % | $ 1.90 | $ 3.10 | 53% |

SYSTEM AND METHOD FOR ANALYZING AND SEARCHING FINANCIAL INSTRUMENT DATA

CROSS-REFERENCE TO RELATED APPLICATIONS

This application claims priority to U.S. Provisional Patent Application Ser. No. 60/391,219 filed Jun. 26, 2002 and entitled "Improved Interactive Server and Method of Use," the contents of which are hereby incorporated herein by reference in its entirety.

FIELD OF THE INVENTION

The present invention relates generally to on-line financial data systems, and more particularly, to computer systems and methods for searching for financial instruments using user-defined parameters.

BACKGROUND

Systems and methods have been developed that allow individuals to use their own search parameters to search for financial instruments such as, for example, stocks, bonds, stock options, and option strategies such as covered calls, covered puts, spreads, etc. For example, U.S. Pat. No. 6,049,783 entitled "Interactive Internet Analysis Method" and U.S. patent application Ser. No. 09/676,374 filed on Oct. 29, 2000 and entitled "System and Method for Analyzing and Searching Financial Instrument Data," the contents of both of which are hereby incorporated by reference in their entirety, describe systems and methods for searching and implementing stock and stock option strategies.

Although these existing systems represent a significant advance in technology, Applicants have recognized several aspects that provide room for improvement. For example, existing systems and methods for analyzing financial instrument data typically use data that may have been retrieved several minutes earlier to process user requests. Existing interactive systems download financial instrument data at periodic intervals such as, for example, 20 minute intervals. The downloaded financial data is processed to derive values for a set of searchable parameters, and the financial data and values for the set of searchable parameters are made available for searching by users. When a user's search criteria for financial instruments is received, the search is performed against the downloaded financial data, which may have been downloaded several minutes earlier, and the values for the searchable parameters, which are derived from the financial data that may have been downloaded several minutes earlier. Of course, during hours of the day when financial markets are open, market data relating to the financial instruments is constantly changing. Because existing searching systems download data periodically, the data used in these systems to respond to user searches may not reflect the most current market conditions. Therefore, in existing systems, although a response to a user's search may be generally accurate and very useful, it may be based upon financial data that was downloaded several minutes earlier and not reflect the most recent market data.

Existing systems provide functionality that allow users to search for and analyze individual stock option strategies. For example, prior systems allow users to search for covered call, covered put, and spread strategies available for a particular stock during a particular month. The capability to search for and review individual stock option strategies is very useful and has been well received. Applicants have noted, however, that prior systems lack functionality to allow users to compare and contrast different options strategies, e.g. covered calls vs. covered puts vs. bear-call-spreads, etc., that are available for a particular stock.

Applicants have also noted that once an investor has invested in an option strategy such as a covered call or bull-put-spread, the investor may have a multitude of trading opportunities going forward involving the same underlying stock. Existing systems lack the functionality to allow investors to identify and capitalize on these opportunities.

Furthermore, Applicants have noted that an investor with a position in a stock that has decreased in value may desire to get back to break-even on the investment. One investing strategy for doing so is referred to as "stock repair." Generally, stock repair refers to an strategy wherein an investor with a position in a stock that has decreased in value sells call options equal to two times the number of shares of the stock that is owned, and covers the additional call options by buying call options at a lower strike price. However, it is not readily determined which "stock repair" strategies are available and the relative strengths of those "stock repair" strategies. Prior systems provide no capability to assist investors in locating and comparing stock repair strategies.

SUMMARY

Improved systems and methods for analyzing and searching financial instrument data are disclosed herein.

An exemplary system responds to user defined searches with recently updated financial data. Financial data relating to stocks and stock options is collected from multiple sources and calculations performed thereon to derive values for a set of searchable screening parameters related to sophisticated investment strategies such as option spreads. Investors access the system and provide values and/or ranges of values for searching the set of searchable financial instrument screening parameters. The exemplary system determines the set of options and/or option spread strategies that satisfy the investor-defined search criteria. For those options and/or option spread strategies that satisfy the investor-defined search criteria, corresponding financial data is retrieved and calculations performed thereon to derive values for a set of parameters. The recently retrieved financial data and the recently calculated values for the set of parameters are forwarded to the investor that initiated the search request. Retrieving updated financial data for the option spread strategies that have been found to satisfy the investor-defined search criteria provides that the search results and the associated financial data that are presented to the investor reflect current market conditions.

An exemplary system allows investors to compare and contrast various different option strategies. The exemplary system receives identification of a stock from the investor and determines the option strategies available for the stock. For example, the system presents a listing of the following including for each strategy instance an indication of return and risk associated with the strategy: covered calls, covered puts, collars, calendar LEAP spreads, bull put credit spreads, bear call credit spreads, bull call debit spreads, bear put debit spreads, speculative buy calls, and speculative buy puts that are available for the specified stock. Thus, various different option strategies are presented together so they may be compared and contrasted. The exemplary system is adapted to receive from the investor an indication of whether the investor believes the underlying stock will move up or down and by what amount. In response, the exemplary system identifies the returns on stock option strategies given the expected movement in the underlying stock.

An exemplary system also provides investors with potential trading opportunities given their current investment position. Upon receipt of an identification that an investor has a position in a particular option strategy such as, for example, a covered call or bull-put credit spread, the exemplary system determines several potential outcomes for the strategy going forward: the value of the strategy if it were liquidated at the current market prices; the value of the strategy if it is held until expiration; and a listing of additional option strategies relating to the same underlying stock that the investor may wish to consider.

An exemplary system assists investors in identifying and implementing stock repair strategies. Upon receipt of a stock identifier and the price that was paid for the stock, the exemplary system searches for pairs of options that offer a potential stock repair. The exemplary system accepts investor selections of suggested stock repairs and formats the same for execution by a brokerage or on a trading system.

BRIEF DESCRIPTION OF THE DRAWINGS

Other features of the disclosed embodiments are further apparent from the following detailed description taken in conjunction with the accompanying drawings, of which:

FIGS. 10A-D are diagrams of an exemplary user interface for presenting for comparison a listing of potential option strategies relating to a selected stock;

FIGS. 13A-E are diagrams of an exemplary user interface for presenting potential follow-up investment opportunities to an investor;

FIGS. 15A-C are diagrams of an exemplary user interface for presenting stock repair strategies.

DETAILED DESCRIPTION OF ILLUSTRATIVE EMBODIMENTS

Figure 1:
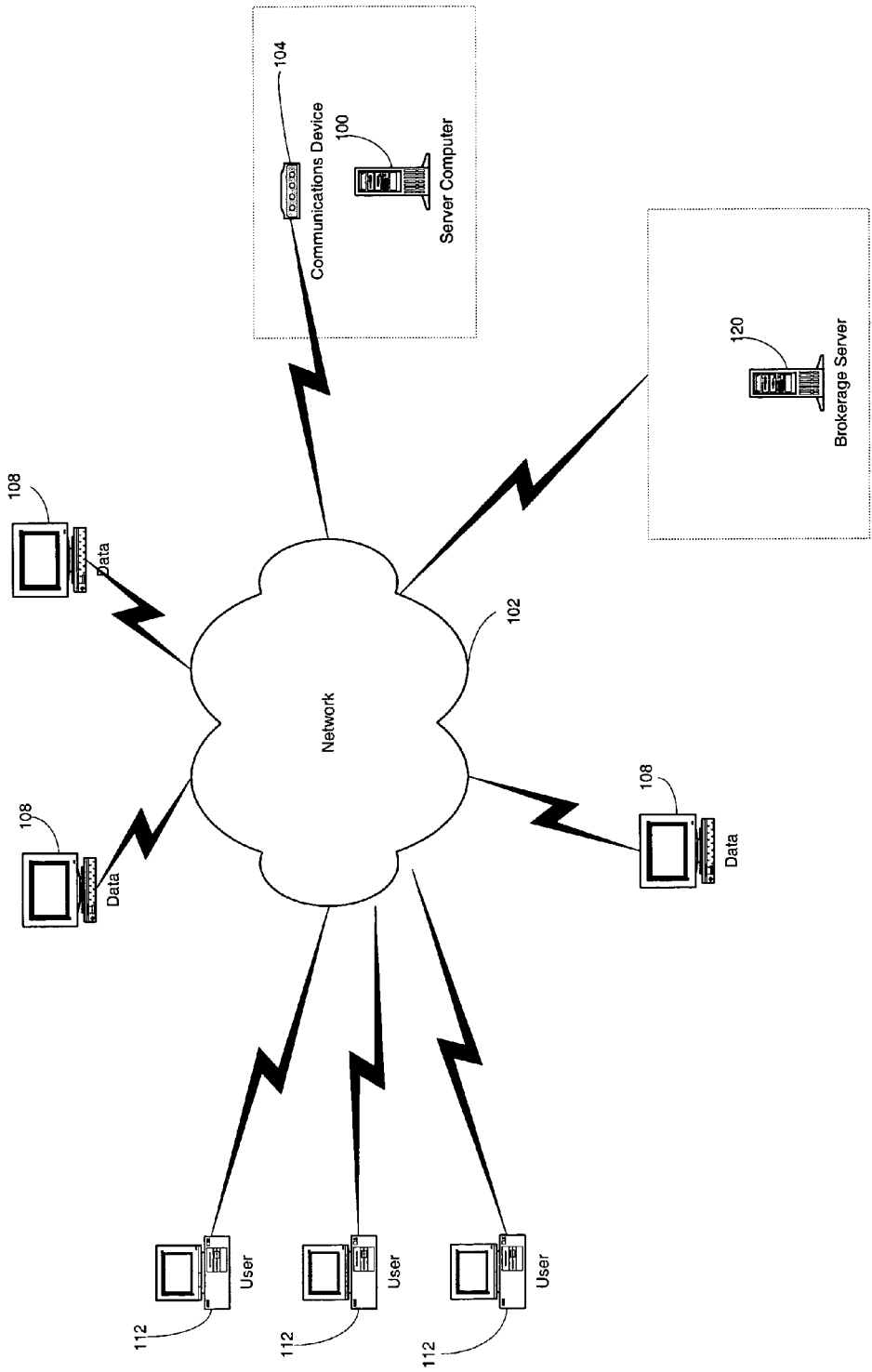
FIG. 1 is a high level diagram of a network for providing financial data.

Illustrative embodiments of systems and methods for searching for and analyzing financial instrument data are described below with reference to FIGS. 1-16. It will be appreciated by those of ordinary skill in the art that the description given herein with respect to those figures is for exemplary purposes only and is not intended in any way to limit the scope of the potential embodiments. All questions regarding the scope of potential embodiments may be resolved by referring to the appended claims.

Applicants have previously disclosed systems and methods for searching and analyzing financial data as described in U.S. Pat. No. 6,049,783 entitled "Interactive Internet Analysis Method" and U.S. patent application Ser. No. 09/676,374 filed on Oct. 29, 2000 and entitled "System and Method for Analyzing and Searching Financial Instrument Data," the contents of both of which are hereby incorporated by reference in their entirety. Generally, in prior systems and the presently disclosed system, financial data associated with various financial instruments is collected from sources and calculations performed thereon to derive values for a set of searchable financial instrument screening parameters. Users may access the system and provide values and ranges of values for searching the set of searchable financial instrument screening parameters. In response, users are presented with the set of financial instruments, or derivatives, in sorted order, that satisfy the user-supplied search values.

Applicants disclose herein improvements to existing systems and methods for financial instrument searching and analysis. According to an embodiment of the exemplary systems and methods, near real time data is reflected in investor search results. According to another aspect of the exemplary systems and methods, different investment strategies are presented together so that they can be compared and contrasted. Also, an aspect of the exemplary systems and methods facilitates identifying potential investment opportunities given an existing trading position. Furthermore, according to an aspect of the disclosed embodiments, systems and methods for searching for available stock repair opportunities are disclosed.

Exemplary systems and methods for analyzing stock option strategies, such as option spreads, are disclosed herein. It should be noted that the exemplary system described below is provided for illustrative purposes only and in no way is meant to limit the potential embodiments. While the exemplary system is described with respect to collecting, analyzing, and searching stock and stock option data, the system likewise could be applied to collect, analyze, and search data related to bonds, mutual funds, commodities, indexes, currencies, and their derivatives, or any other type of instrument as well.

Generally, users employ the exemplary systems to search for stock options including call options and put options. A call option is an option contract that gives the holder the right to buy a certain quantity (usually 100 shares) of an underlying security, such as a stock, from the writer of the option, at a specified price (the strike price) up to a specified date (the expiration date). A put option is an option contract that gives the holder the right to sell a certain quantity of an underlying security to the writer of the option, at the strike price up to the expiration date.

Investment strategies related to put options and call options include covered calls and covered puts. A covered call is an investment wherein a call option is sold while simultaneously holding an equivalent position in the underlying security. A covered put is an investment wherein a put option is sold while maintaining a short position on an equivalent amount in the underlying security. When an option is purchased without owning the underlying stock, the option is said to be naked. Thus, a naked call is an investment wherein a call option is written without owning the corresponding number of shares of the underlying stock. A naked put is an investment wherein a put option is written without shorting the underlying stock.

The put option and the call option are basic financial instruments to which the exemplary system is directed. However, the exemplary system is more sophisticated and provides greater assistance to investors by providing analysis of stock option spread strategies, which are investments that involve simultaneous positions in a plurality of stock options. Specifically, the exemplary system assist users in identifying desirable option spread strategies such as the following: bull put spreads; bear call spreads; calendar spreads; collar spreads; strangle spreads; butterfly spreads; and straddle spreads.

DEFINITIONS

A bull put spread is a spread strategy wherein a first put option is purchased and a second put option is sold, both generally having the same expiration date.

A bear call spread is a spread strategy wherein a call option with a higher striking price is purchased and a call option with a lower striking price is sold, both options generally having the same expiration date.

A bear call credit spread strategy is a bearish combination investment strategy where the investor realizes a profit by making cash from a net credit formed by the difference between the premium earned on a sold call and the premium paid for a bought call. While the stock goes down, the investor keeps the net difference in premiums.

A bear put debit spread strategy is a bearish combination investment strategy where the investor realizes a profit when the value of a long put increases as the stock price drops. The sold put helps to offset the cost of the long put and also provides a finite maximum risk level.

A bull call debit spread strategy is a bullish combination investment strategy where the investor realizes a profit when the value of a long call increases as the stock price rises. The sold call helps to offset the cost of the long call and also provide a finite maximum risk level.

A bull put credit spread strategy is a bullish combination investment strategy where the investor realizes a profit by making cash from a net credit formed by the difference between the premium earned on a sold put and the premium paid for a bought put. While the stock goes up, the investor keeps the net difference in premiums.

A butterfly spread is a spread strategy that involves combining a bull put spread and a bear call spread wherein four striking prices are involved, with the lower two being utilized in the bull spread and the higher two in the bear spread.

A calendar spread is a spread strategy in which a short-term option is sold and a longer-term option is purchased, wherein each option has the same strike price.

A collar spread is an a spread strategy consisting of a standard covered call, wherein a call option is written and the underlying stock is purchased, and purchasing of a put option in the underlying company for downside protection.

A straddle spread is a spread strategy wherein an equal number of puts and calls having the same terms are either purchased or sold.

A strangle spread is a spread strategy involving a put option and a call option with the same expiration dates and different strike prices.

The disclosed system automatically derives returns for the above listed stock option spread strategies and allows users to search the return data as well as other parameters to identify desirable investments. Upon locating a desirable spread strategy, for example a particular bull-put spread, the system can automatically have executed the options and/or stock trades that comprise the investment strategy. Thus, by selecting to execute a single spread strategy, all of the component transactions that are comprised in that investment strategy are automatically executed. The user does not need to specify the component transactions; this is done by the system automatically.

FIG. 1 is a high level diagram of the exemplary system for analyzing financial data. Server 100 is a computing system that collects, analyzes, and provides access to financial data. Server 100 operates as a database server and a hypertext transfer protocol server and may comprise a single computing machine or a plurality of computers.

Data source servers 108 are computing systems that operate as repositories of financial data. The repositories may include both public and private sources. For example, data source servers 108 may include data servers operated by Data Transmission Network Corporation (DTN), Chicago Board of Options Exchange (CBOE), and Zacks Investment Research, as well as others.

Network 102 may be any electronic network including the Internet. User or investor terminals 112 provide users with access to server 100 via network 102 and communications device 104. User terminals 112 may be personal computers, hand-held computing systems, or even wireless phones. User terminals 112 are generally loaded with Internet browser software such as Netscape Navigator or Microsoft Explorer and are operable to communicate over network 102 to download data including web pages from server 100.

Brokerage server 120 is a server machine that provides a gateway to an organization such as a brokerage house or electronic trading system that executes trades in stocks, stock options, and the like. Brokerage server 120 provides an interface to the brokerage or system through which requests for execution of trades are routed. Brokerage server 120 may be operable to interface with a trading network such as Nasdaq or an electronic communication network (ECN) such as Archipelago, and route trades to such networks.

Generally, server 100 communicates with data source servers 108 to gather financial data related to financial instruments. After downloading financial data from the data source servers 108, server 100 calculates values for various searchable financial instrument-screening parameters. With respect to the exemplary embodiment, server 100 derives returns for potential investments and searchable financial instrument screening parameters that may be used to screen for stock options and strategies. Users access server 100 over network 102 to search for options and option spread strategies. Upon identifying a particular option or option spread strategy, a user may issue a request to execute a trade on the option or option spread strategy. The request is routed from user terminal 112 to server 100. Server 100 forwards the request over network 102 to brokerage server 120 where the transaction is executed.

Figure 2:
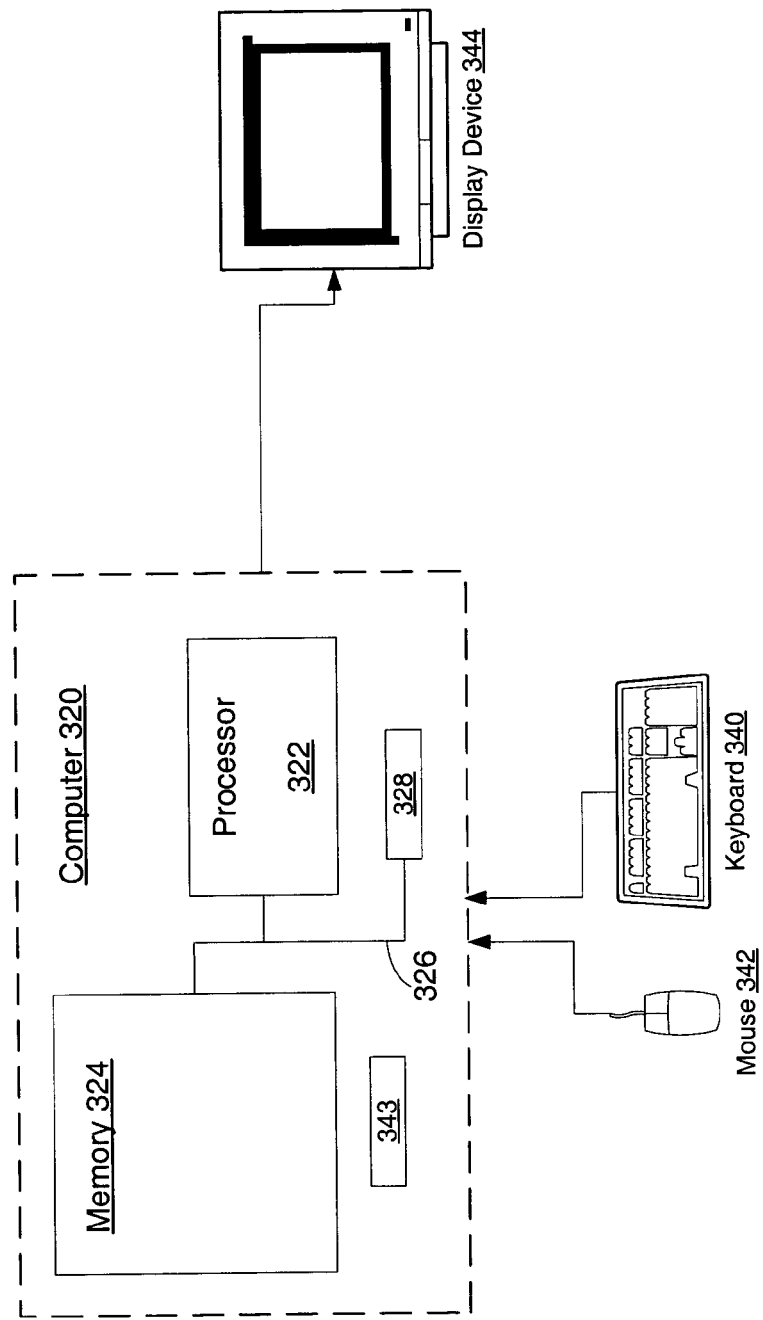
FIG. 2 is a diagram of a computing system for use in the disclosed embodiments.

Server computer 100, data servers 108, brokerage server 120, and customer terminals 112 are generic computing systems. FIG. 2 is a block diagram of a computing system suitable for this use. As shown, computing device 320 includes processing unit 322, system memory 324, and system bus 326 that couples various system components including system memory 324 to the processing unit 322. The system memory 324 might include read only memory (ROM) and random access memory (RAM). The system might further include hard-drive 328, which provides storage for computer readable instructions, data structures, program modules and other data. In use, a user may enter commands and information into the computer 320 through input devices such as a keyboard 340 and pointing device 342. A monitor 344 or other type of display device is also connected to the system for output. Communications device 343, which in one embodiment may be a modem, provides for communications over network 102. Processor 322 can be programmed with instructions to interact with other computing systems so as to perform the algorithms and serve the web pages described below with reference to FIGS. 4 through 28. The instructions may be received from network 102 or stored in memory 324 and/or hard drive 328. Processor 322 may be loaded with any one of several computer operating systems such as Windows NT, Windows 2000, or Linux.

Figure 3:
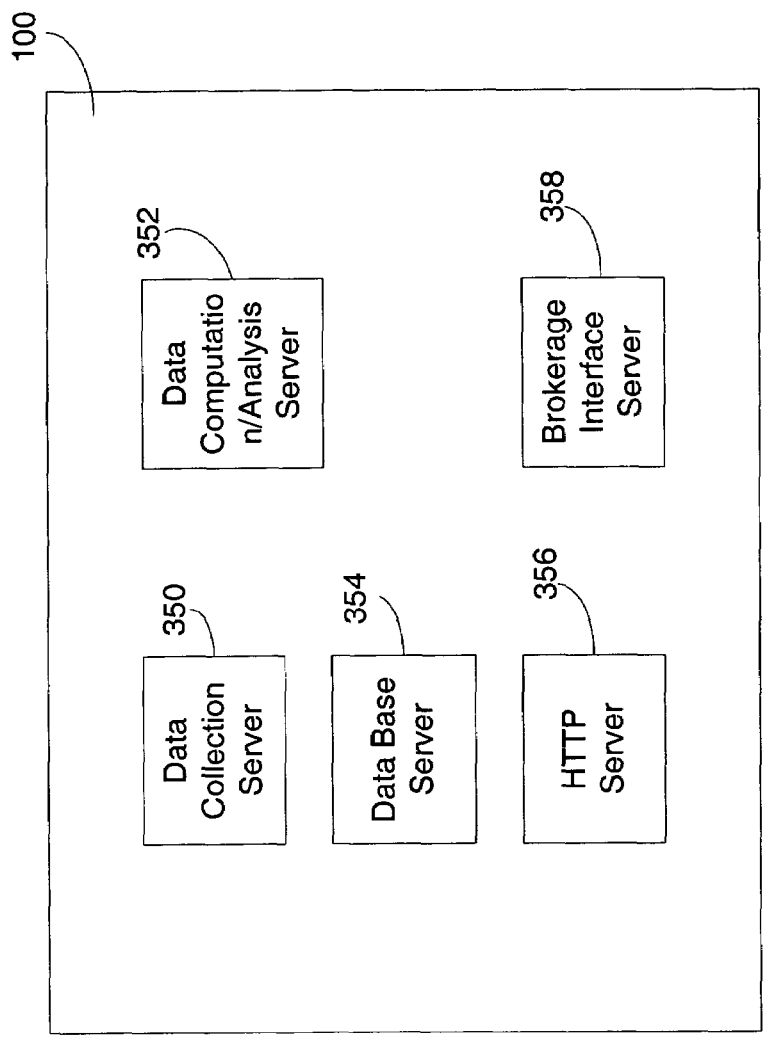
FIG. 3 is a block diagram depicting functional components of a server machine.

FIG. 3 is a diagram of the functional components of server 100. As shown, server 100 comprises data collection server 350, data computation/analysis server 352, database server 354, hypertext transfer protocol (HTTP) server 356, and brokerage interface server 358. Data collection server 350 operates to download financial instrument data from data servers 108. Data computation/analysis server 352 operates to compute searchable financial instrument screening parameters from the financial instrument data. Database server 354 maintains and provides access to the financial instrument data and searchable parameters. Database server 354 may comprise any of numerous commercial database software systems such as those produced by Oracle Corporation and Microsoft Corporation. Database server 354 handles queries of the financial instrument data and searchable financial instrument screening parameters. HTTP server 356 maintains hypertext mark up language (HTML) pages, serves dynamic HTML objects, and provides fault tolerance and load balancing. HTTP server 356 may comprise any of several well-known HTTP server software systems, but is preferably the Windows NT server produced by the Microsoft Corporation. Brokerage interface server 358 operates to forward trade orders for financial instruments. These orders may be forwarded to a brokerage and/or to a trading system such as the Nasdaq or an ECN. It should be noted that server 100 might comprise a single computing machine or a plurality of computing machines. Furthermore, data collection server 350, data computation/analysis server 352, database server 354, HTTP server 356, and brokerage interface server 358 may be comprised in a single software server and further may be located on a single computer system.

Figure 4:
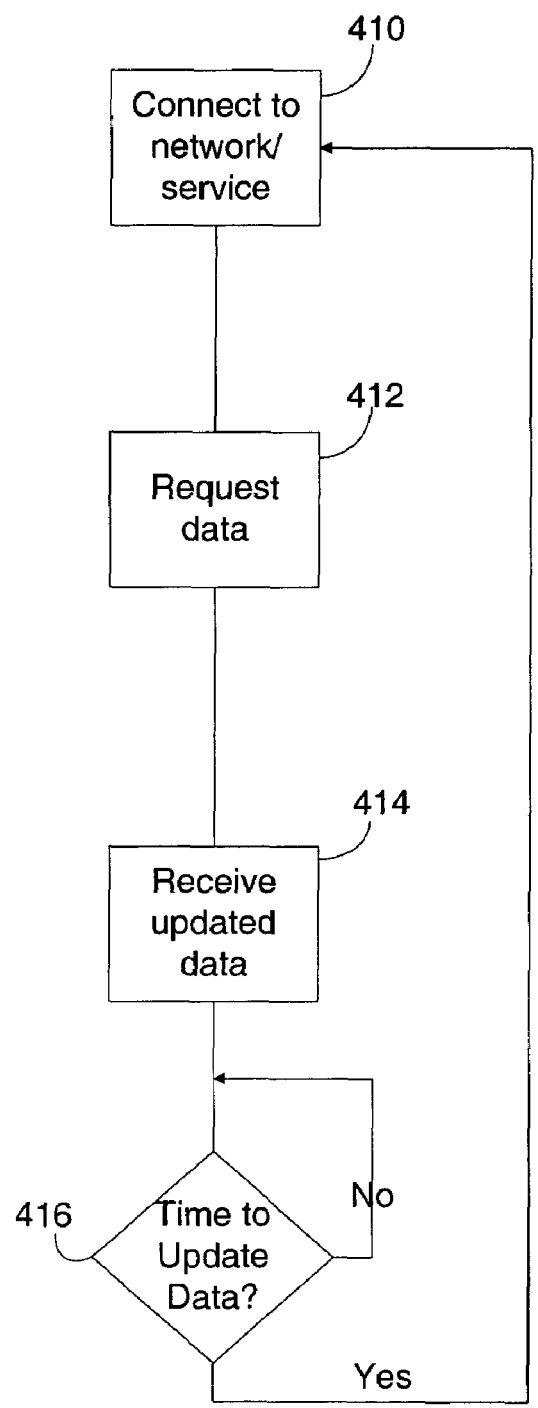
FIG. 4 is a flow chart of a process for retrieving financial data over a network.

FIG. 4 provides a flow chart of a process performed by server 100 for retrieving financial data from data servers 108. As shown, at step 410 servers 100 establishes a connection to network 102 if one does not already exist. At step 412, server 100 issues a request to one or more data servers 108. The request identifies to data server 108 which data is being requested. At step 414, the requested data is received at server 100. In an exemplary system, the financial data that is downloaded relates to stocks and stock options. Accordingly, in the exemplary system, the financial data may comprise the following: stock symbol—denoting the trading symbol for stock in a particular company; option symbol—denoting the trading symbol for a stock option in a particular company; stock ask price—denoting the asked price or closing price of the underlying stock; expiration/strike price—denoting the month a particular option expires and the price of the option; option bid—denoting the highest price for a market sell order of a particular option; option volume—denoting the number of options contracts traded in the current trading day; open interest—denoting the number of option contracts in the life of a contract; p/e ratio—denoting the price to earnings ratio using last years earnings; average recommendation—denoting the average broker recommendation for a particular stock (a numerical rating with numeral 1 signifying the best and numeral 5 signifying the worst); share—denoting the number of common shares outstanding; beta—denoting a measure of stock volatility relative to the Standard and Poor's 500 index; company name—indicating the name of a company; Zack's indicator—denoting an industry classification; and recommended list—denoting a list of advisory service recommendations. This data may be downloaded from one or multiple sites to server 100.

In an exemplary embodiment of the disclosed system, the financial data is periodically downloaded so that the data and parameters calculated there from reflect recent market fluctuations. In one embodiment, for example, the data may be updated every 20 minutes. However, periods of greater or lesser frequency may be employed. For example, financial data may be updated continuously in real time. Thus, as shown in FIG. 4, at step 416, it is determined whether the financial data should be updated. If not, the system continues to monitor as to whether the data should be updated. If the financial data needs to be refreshed, control returns to step 410. As explained in connection with FIG. 6, even if financial data is downloaded periodically, according to the exemplary systems and methods, results from user-defined searches and requests reflect very recent market data.

Figure 5:
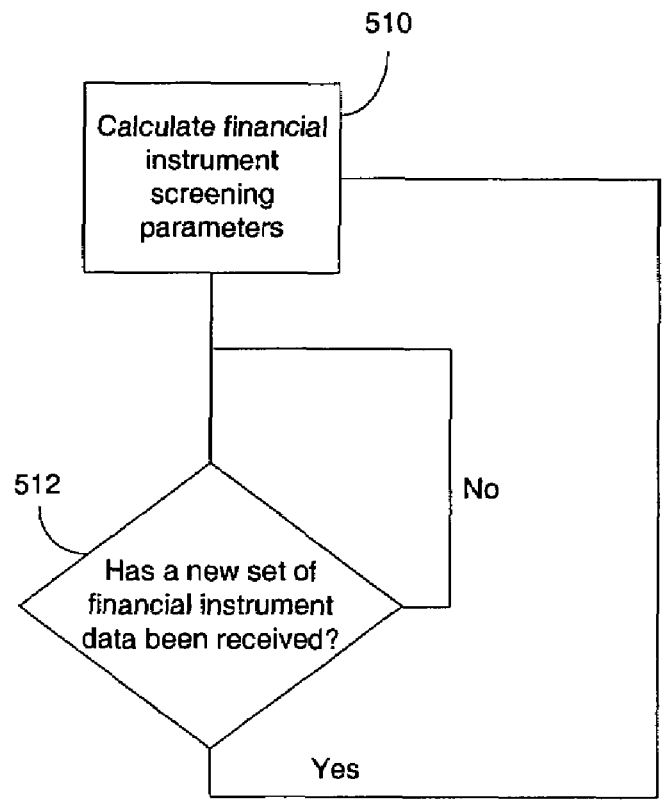
FIG. 5 is a flow chart of a process for calculating values for financial screening parameters.

Server 100 uses the downloaded financial data to derive returns on options and option spread strategies and to calculate values for a plurality of screening parameters. FIG. 5 provides a flowchart of this process. As shown, at step 510, server 100 uses the financial data that was previously downloaded to derive returns on possible spread strategies such as bull-put spreads and bear call spreads as well as other screening parameters. At step 512, server 100 determines whether the financial instrument data has been updated. If so, the screening parameters are updated at step 510.

The screening parameters that may be calculated by server 100 include the following: percentage option volume—denoting the ratio of the number of options contract traded that day to the average option volume over a defined number of previous days, e.g. 30 days; percentage if not assigned—denoting the ratio of the sum of the option bid and stock price appreciation to the difference between stock price and option bid; percentage if assigned—denoting the ratio of option bid to the difference between stock price and option bid; percentage EPSG (Earnings Per Share Growth)—denoting the ratio of the difference between earnings last year and earnings this year to earnings last year; percentage range—denoting the percentage of range between the year's high and low for the stock which is calculated as the ratio of the difference between the current stock price and the low stock price for the year to the difference between the high stock price for the year and the low stock price for the year; percentage volume—denoting the percentage change from the previous day's volume on the stock and calculated as the ratio of the previous day's stock volume to the average number of shares traded in 60 days; percentage yield—denoting the annual dividend yield on the underlying stock and calculated as the ratio of four times the dividend yield per quarter to the price of the underlying stock; delta—denoting the change in option price versus the change in stock price; Black-Scholes Ratio—denoting the bid price divided by the Black-Scholes value for the particular option; volatility—denoting the historical price volatility of the stock and calculated by measuring the annual standard deviation of the daily price changes in the stock; implied volatility—denoting the volatility based on the actual price of the option as opposed to the historical price fluctuation; and percentage to double price—denoting the percent price movement in the stock price to cause the option to double in price.

The calculated parameters are useful to potential investors in deciding which investments to make. For example, the Black-Scholes ratio provides an effective tool for comparing investment values. Generally, Black-Scholes is a model for options pricing. The Black-Scholes model uses information such as the historical volatility of the underlying stock, time to expiration, and the risk free interest rate to estimate a fair value for an option. In an exemplary embodiment of the disclosed system, the Black-Scholes ratio is calculated by dividing the option estimate calculated using the Black-Scholes model into the actual value of the option as determined by the market. The ratio provides the investor with an indication whether a particular option is under or over valued. The ratio is greater than one if the option is over valued relative to the Black-Scholes theoretical value. The ratio is less than one if the option is under valued relative to the Black-Scholes theoretical value. The ratio information can be very useful to investors who are considering buying or selling an option or spread strategy.

Option volume percentage is another of the calculated parameters. Stock volume has long been used as an indicator of stock activity but has not been as reliable with the advent of derivative products such as options. Option volume provides faster feedback than stock volume on breaking news but analysts are faced with the problem of deciding which month or strike price to consider. The option volume percentage parameter employed in an exemplary system solves this problem by creating an indicator, which is the sum of all option volume for puts and calls for all months. The aggregate number is a good indicator of this activity and is not as sensitive to the time of the month relative to expiration or the closeness of the stock price to the strike price. It is a more universal indicator of activity. In order to observe relative changes to this activity, the option volume for the day is compared to the average volume over some period of time, such as 30 or 50 days average. The volume is measured as a percentage change from this average.

In addition to calculating the various parameters mentioned above, the disclosed system also calculates returns for a plurality of different options and option spread strategies including covered calls, covered puts, naked calls, naked puts, bull put spreads, bear call spreads, strangle spreads, straddle spreads, calendar spreads, collars spreads, and butterfly spreads. With respect to the covered calls and covered puts, the return values include the percentage if assigned, which represents the percentage return if the option is called, and percentage if not assigned, which represents the percentage return on the transaction if the option is called. With respect to the naked calls and naked puts, the percentage naked return is calculated, which represents the return based on the margin requirements for the particular option. With respect to the various spreads, the percentage returns are calculated which represent the maximum profit realized from the spread as a percentage of the margin requirement.

It should be noted that, with respect to all of the options and option spread strategies, the percentage returns are available as search parameters in addition to the many other search parameters. Accordingly, users can locate an option or option spread based upon percentage return and evaluate the return in light of the investment risk as dictated by the other investment parameters. Having the return data available is especially useful to investors in assessing the risk verses reward of an investment.

Users at terminals 112 may issue requests to server 100 to search for stock options and related stock option spread strategies such as bull put spreads and bear call spreads. As noted in connection with FIG. 4, the financial data that serves as the basis for responding to user requests may be downloaded periodically, for example, at 20 minute intervals. Furthermore, as noted in connection with FIG. 5, the downloaded financial data is processed to calculate values for a set of searchable parameters, and the data and values for the set of searchable parameters are made available for searching by users. This processing may take several minutes given the limitations of current computing systems and the very large number of stocks and stock options that are actively traded and for which calculations must be made. For example, this data processing may require numerous calculations involving over one-hundred-thousand stock options. Therefore, due to the delay between downloading of the financial data and any delay introduced with processing of the data, when a user's search criteria for financial instruments is received, the search may be performed against the downloaded data that was downloaded several minutes earlier, and against values for the searchable parameters that were derived from the data that may have been downloaded several minutes earlier. Of course, during hours of the day when financial markets are open, the financial instrument data is constantly changing. Therefore, in prior systems, although a response to a user's search may be generally accurate and very useful, it may be based upon data that was downloaded several minutes earlier and not reflect the most recent market data. In exemplary systems and methods disclosed herein, responses to user search requests reflect current market conditions.

Figure 6:
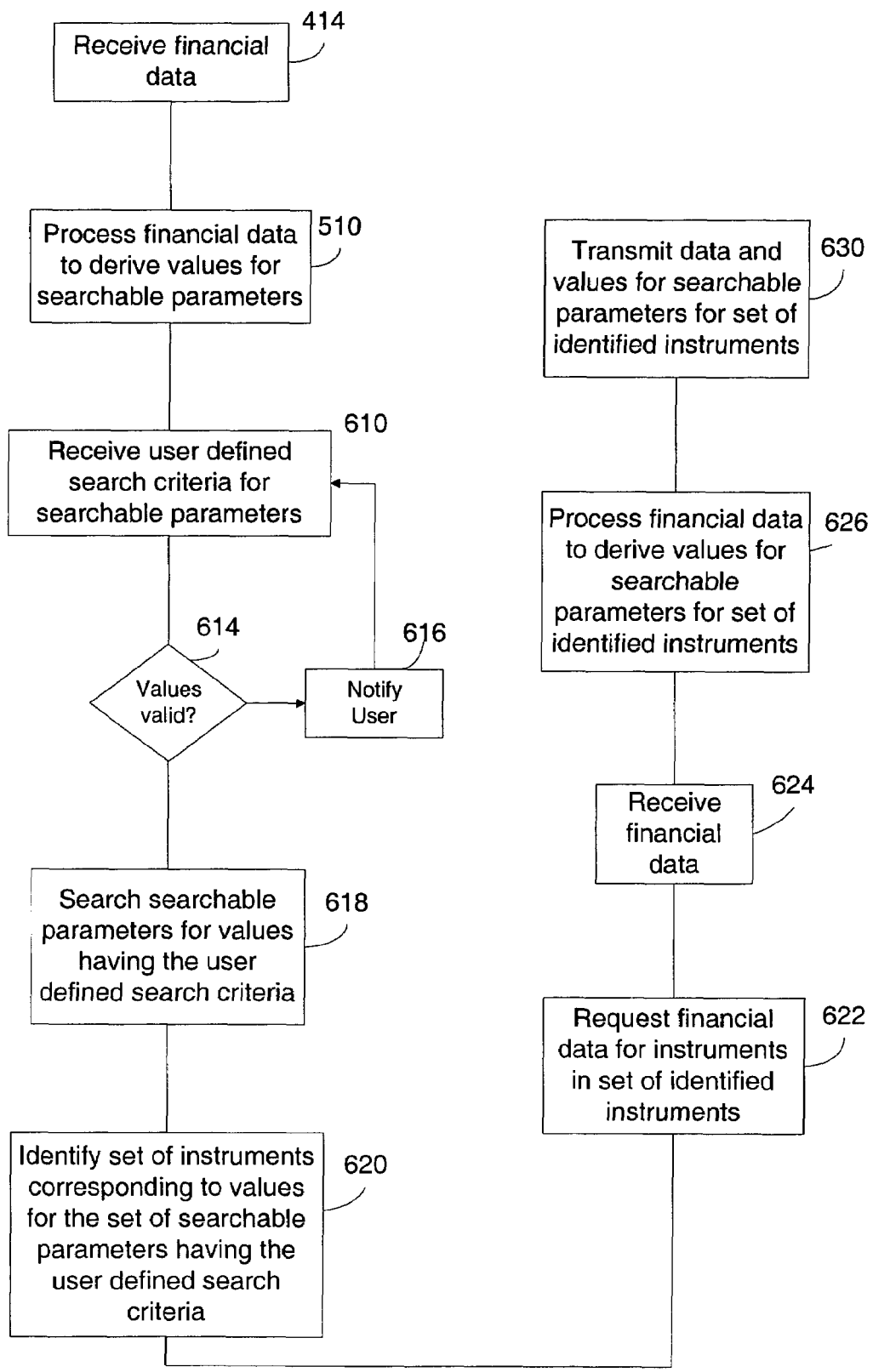
FIG. 6 is a flow chart of a process for servicing user requests for financial data.

A flowchart of an exemplary process for servicing user search requests is depicted in FIG. 6. As shown, at step 414, and as described above in connection with FIG. 4, server 100 periodically receives financial instrument data regarding a large universe of stocks and stock options. At step 510, as described above in connection with FIG. 5, server 100 processes the financial data to determine values for a set of searchable parameters. At step 610, server 100 receives a user search that defines values and/or ranges of values for any or all of the financial data items and searchable parameters derived at steps 414 and 510. Users may use screens such as those described below and in U.S. Patent Application Ser. No. 60/391,219 to input their search criteria. It should be noted that the user search criteria may be received several minutes after steps 414 and 510 have been completed. Thus, the data and values for the search parameters may have been derived several minutes earlier. At step 614, server 100 parses the user defined values to determine if the values entered by the user are logical and operable for searching the database. For example, at step 614 server 100 might validate that a negative value is not inputted for a parameter that cannot, by definition, be negative. Accordingly, if at step 614, it is determined that the values entered by the user are not valid, at step 616, server 100 transmits a notification of such to the user. If the user-defined values are valid, however, at step 618, server 100 searches the database of financial data items and searchable parameters for stock options and/or stock option spread strategies that satisfy the user-defined values. At step 620, sever 100 identifies the set of stocks, stock options, and stock option spread strategies that satisfy the user-defined search criteria. The set of stocks, stock options, and stock option spread strategies that satisfy the user-defined search criteria is likely to be a relatively small subset of the overall universe of stocks, stock options, and stock option strategies.

At step 622, server 100 requests the most recent underlying financial data corresponding to the set of stocks, stock options, and/or stock option spread strategies that have been identified as satisfying the user-defined search criteria. At step 624, server 100 receives the underlying financial data corresponding to the identified set of stocks, stock options, and stock option strategies. The particular data items that are requested and received for the identified set of stocks, stock options, and/or option strategies may comprise, for example, the financial data items that are described above in connection with FIG. 4. It should be noted that financial data that is requested and received corresponds to the set of stocks, stock options, and stock option strategies that satisfy the user-defined search. Because this is likely to be a small subset of the overall universe of financial data, the time needed to request and receive the data is likely to be relatively small.

At step 626, server 100 processes the received financial data to derive values for the searchable parameters corresponding to the set of identified stocks, stock options, and/or stock option spreads that satisfy the user-defined criteria. The values derived may comprise, for example, those described above in connection with step 510 of FIG. 5. Those skilled in the art, will recognize that the time needed to process the data for the set of identified stocks, stock options, and strategies will likely be minimal given that a subset of the universe of financial instrument data is typically processed at step 626. At step 630, the financial data corresponding to the set of identified stocks, stock options, and strategies is transmitted to the user for display. The data that is delivered to the user reflects financial data that was recently retrieved and processed and identified as being responsive to the user's request. Because the data was recently received, it is likely to more accurately reflect current market conditions. Thus, in exemplary systems where financial data is not continuously received, the results of user-defined searches reflect current market conditions.

The exemplary systems and methods provide a capability to trade on an option, option spread strategy, or stock repair strategy that has been located using the techniques described herein. When a user receives the results of the query, he or she may decide to execute one or more of the transactions that are specified in the query results. For example, the user may decide to execute one of the covered calls, i.e. buy a call option and purchase the underlying stock, one of the bull put spreads, i.e. buy a put option and sell a put option, or one of the stock repair strategies, i.e. sell two call options and buy a separate option, that are listed in a query result.

Executing an option spread strategy or a stock repair that is specified in the results of a search, therefore, may involve the simultaneous execution of multiple trades. For example, as is described below, a stock repair strategy may require selling a call option and purchasing a separate call option. Therefore, executing a stock repair may involve executing several trades. The same applies to many option spread strategies. An exemplary system provides the capability to automatically have these types of multiple trades executed together. Accordingly, stock repair and option spread strategies that may be located using the search capabilities of the present system can be easily executed, including all component trades, simply by selecting to execute a single investment strategy.

Figure 7:
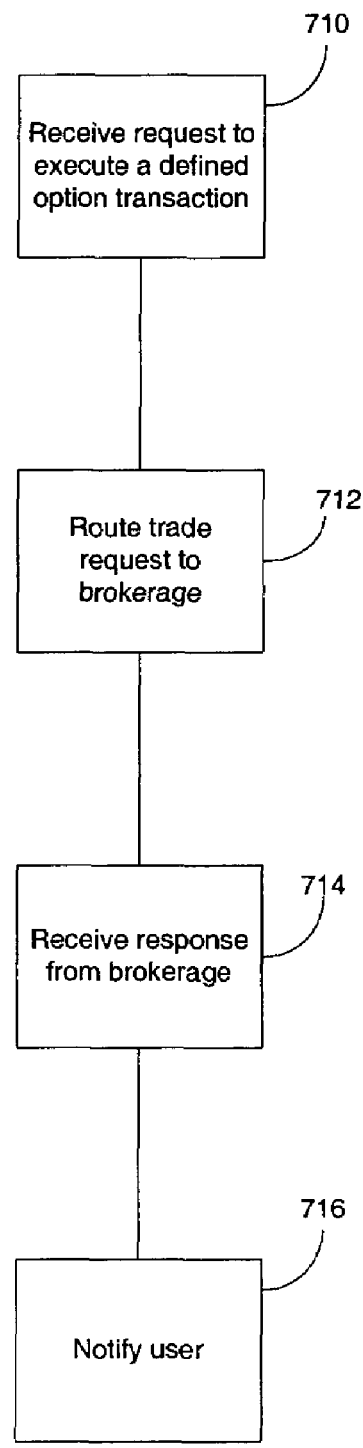
FIG. 7 is a flow chart of a process for executing a trade on a stock option strategy.

A high level diagram for executing a transaction that is specified in the results of a query is shown in FIG. 7. As shown, at step 710, server 100 receives a request from user station 112 to execute an investment transaction. Server 100 routes the request to brokerage server 120. Brokerage server 120 may be located externally or internally to the organization and may interface with a trading system such as Nasdaq or an ECN. Brokerage server 120 processes the transaction. The transaction may either be executed or denied for any number of reasons. At step 712, server 100 receives a response from brokerage server 120. At step 714, server 100 transmits an indication of the status of the transaction to the user at user station 112.

Figure 8:
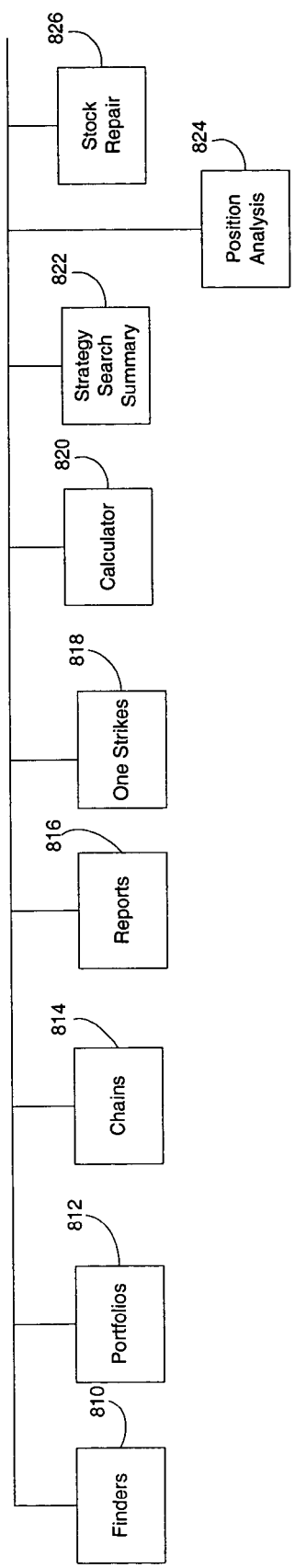
FIG. 8 is a diagram depicting the functionality provided by an exemplary system.

In an illustrative embodiment of the disclosed system, an interface provides various means by which users may search for options, option spread strategies, and stock repair strategies using the financial data and financial search parameters that were previously discussed. FIG. 8 provides a tree diagram representing the structure of an exemplary interface embodiment wherein each box represents a functional area that may be accessed by users to assist them in analyzing and trading stock options and option spreads. As shown, users may access at least the following functional areas: finders 810—to screen for stock options and option spreads that meet a user's criteria; portfolio 812—to list transactions and the related worth of the transaction; chains 814—to view the option strike price and the option months for a selected stock or stocks; reports 816—to view predefined reports generated using the finders 810 functionality; one strikes 818—to view stock and option data related to specific stocks; calculator 820—to recalculate the percentage return if a stock or stock price changes. Each of these functional areas, along with related sub-functions, is discussed in detail in U.S. patent application Ser. No. 09/676,374 filed on Oct. 29, 2000 and entitled "System and Method for Analyzing and Searching Financial Instrument Data," the contents of both of which are hereby incorporated by reference in their entirety. Users may further access the following functional areas which are described in detail below: strategy search summary 822—to view and compare different stock option strategies that are available for a particular stock; position analysis 824—to analyze potential close out and roll out investment alternatives given an existing investment position; and stock repair 826—to identify and implement stock option strategies that might remediate a stock loss.

Strategy Search Summary

Users may wish to view one, all, or a portion of the options corresponding to a particular stock. This functionality is provided using the "chain" (814) and "one strike" (818) functions, which are described in detail in U.S. patent application Ser. No. 09/676,374, the contents of which are incorporated herein by reference. Generally, the "chain" functionality 814 allows users to view the strike option prices and option months available for a selected stock. Using the chain functionality 814, options corresponding to a particular stock can be viewed all together or can be limited to a defined number of strikes above or below the current stock price. It is further possible using the "chain" functionality 814 to view a chain relating to a particular option spread. The spread chain functionality presents the combinations of options that can be used to create a spread between various strike prices for several months of expiration. Chain functions can be displayed for bull put spreads, bear call spreads, collar spreads, strangle spreads, butterfly spreads, straddle spreads, calendar spreads, etc.

The one-strike functionality 818 provides the capability to list for a plurality of stocks, the options that are within one strike of the current stock price. The function is similar to that for chains, with the main difference being that only options or option strategies within one strike of the stock price are listed.

Thus, one-strike 818 and chain 814 functions allow users to search and display options relating to a particular stock and a particular type of spread strategy relating to a particular stock. However, the one-strike and chain functions allow for displaying one particular type of option strategy at a time. For example, a user may view a stock chain or one strike for a collar spread. A chain or one strike for another type of strategy such as, for example, bull-put credit spread must be viewed separately. Viewing potential option strategies separately makes comparing the strategies cumbersome.

Exemplary systems and methods disclosed herein allow an investor to compare and contrast options and option strategies so as to identify those that are most appealing to the user. More particularly, exemplary systems and methods provide for searching for and displaying listings of different option strategy types together so that the user/investor can consider their relative returns and risks. Referring to FIG. 8, functionality to compare and contrast option strategies can be accessed at strategy search summary feature 822. Strategy search summary feature 822 provides the capability to compare a plurality of different types of stock option strategies for a selected stock in a particular month.

Figure 9:
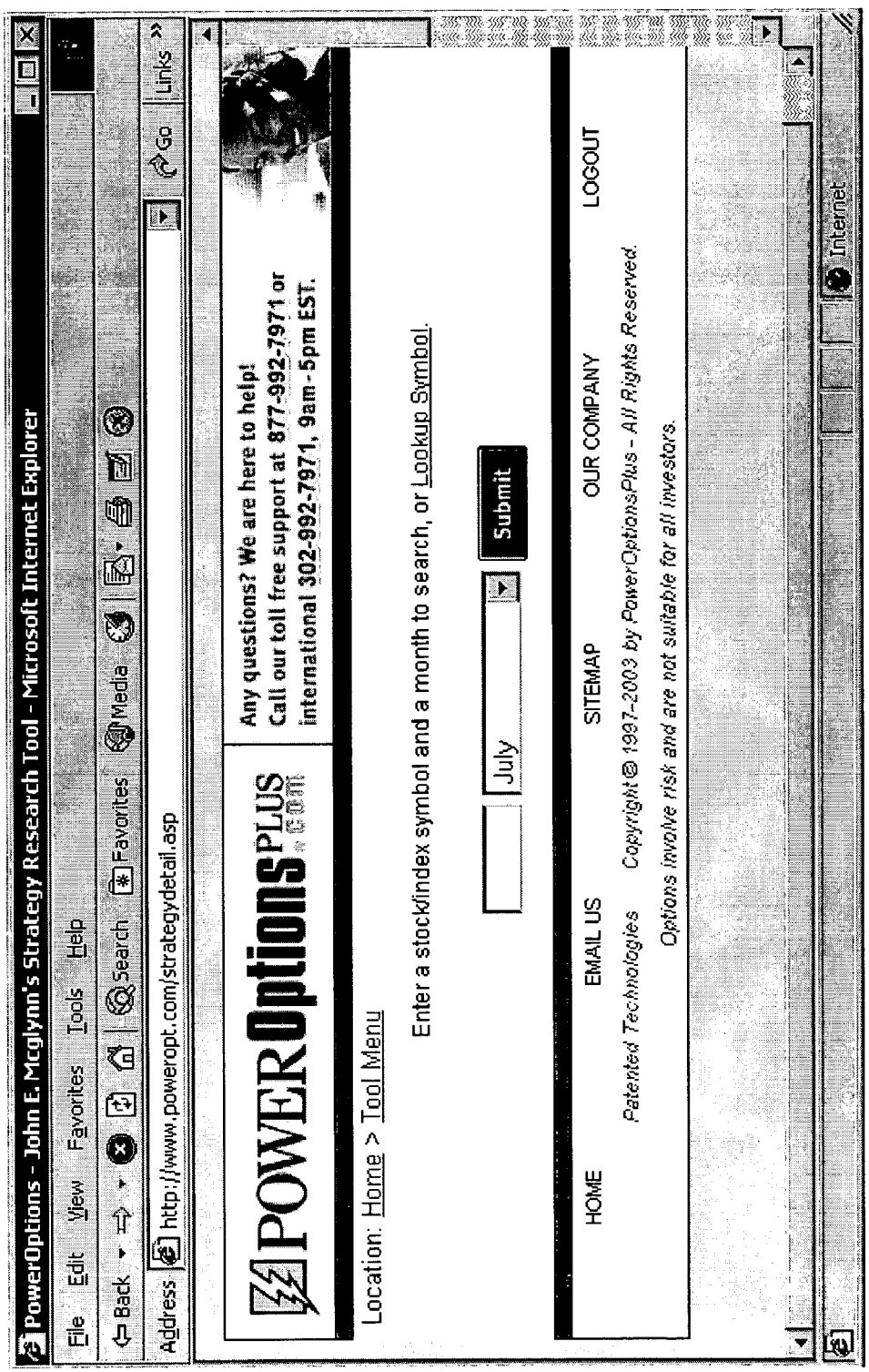
FIG. 9 is a diagram of an exemplary user interface for receiving investor inputs for generating a summary of option strategies for comparison.
Figure 10B:
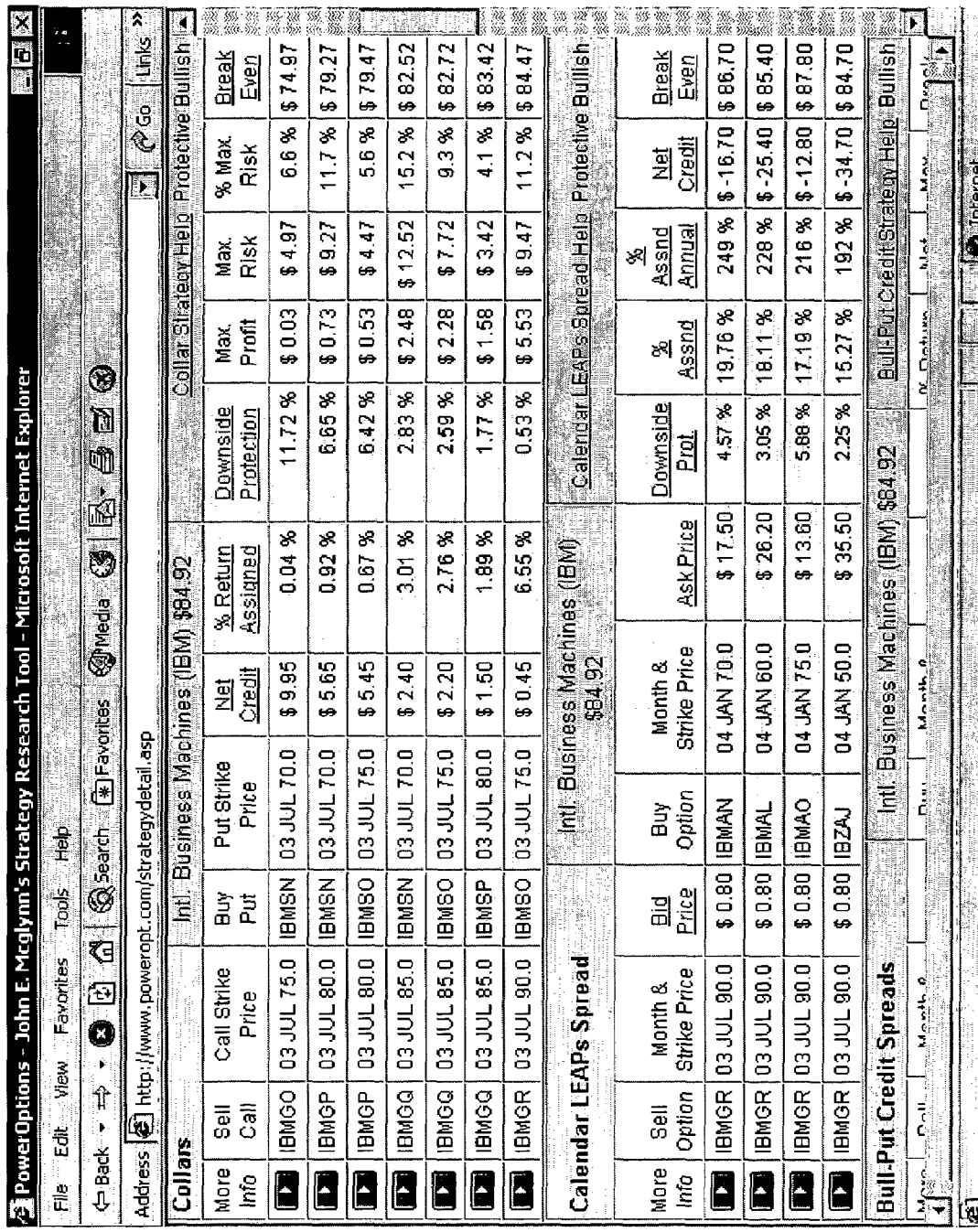
Figure 10C:
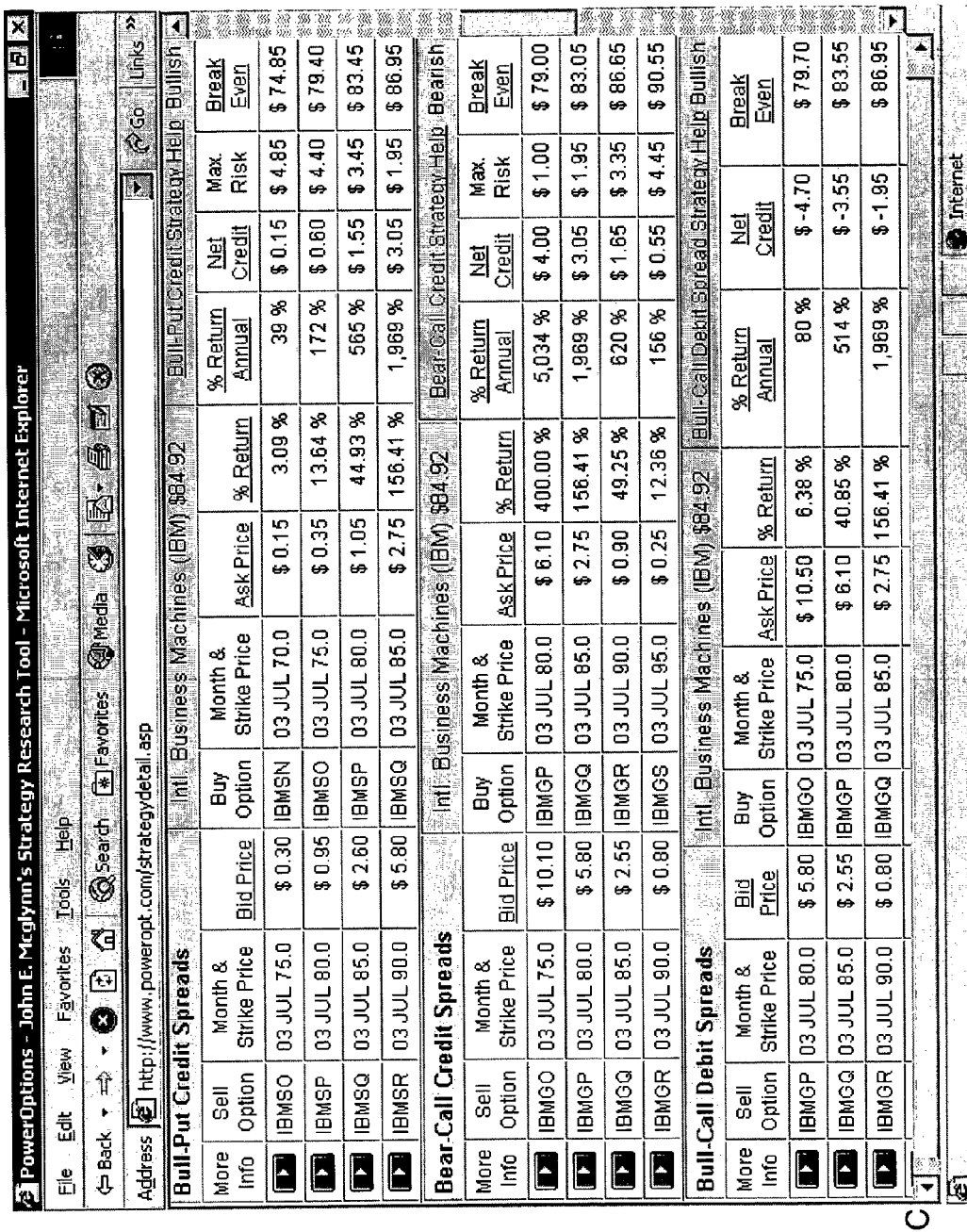

FIG. 9 provides a view of a screen that an investor may access to retrieve information comparing and contrasting different option strategies for a particular stock in a designated month. As shown, a user may identify the company, perhaps by typing a stock symbol, and month for which he or she desires to compare option strategies. Upon receiving the identifying information from the user, server 100 processes the financial data to identify the stock option strategies that are available for the particular stock in the specified month. Furthermore, server 100 searches for instances of the following option strategies that result in a positive net return (i.e. the sum of the amount of money made by the option strategy is greater than the amount of money spent on the strategy instance): covered calls; covered puts; collars; calendar LEAP spreads; bull put credit spreads; bear call credit spreads; bull call debit spreads; bear put debit spreads; speculative buy calls; and speculative buy puts. The return calculations may or may not include any commissions that may be paid in connection with the option strategies.

After server 100 identifies the option strategies with the desired characteristics, which may be those with a positive return, it formats and transmits data relevant to the various option strategies to the user for review. FIGS. 10A-D depict a listing of the following option strategies which may be transmitted by server 100 to the user: covered calls; covered puts; collars; calendar LEAPS spreads; bull-put credit spreads; bear-call credit spreads; bull-call debit spreads; bear-put debit spreads; speculative buy calls; and speculative buy puts. The particular data items that are presented for each of the types of stock option strategies are depicted in FIGS. 10A-D and are similar to those described in connection with one strike and chain functionality as described in U.S. patent application Ser. No. 09/676,374 filed Oct. 29, 2000 and entitled "System and Method for Analyzing and Searching Financial Instrument Data. As shown in the Figures, the various different types of option strategies are listed together and the returns and risks of each strategy are identified. Thus, an user/investor can consider the returns and risks of the strategies together. This is in contradistinction to prior systems that provided only for viewing options and different types of strategies separately and not together. The ability to view the various strategies together greatly facilitates an investor's decision as to which of several different option strategies to pursue.

Figure 11:
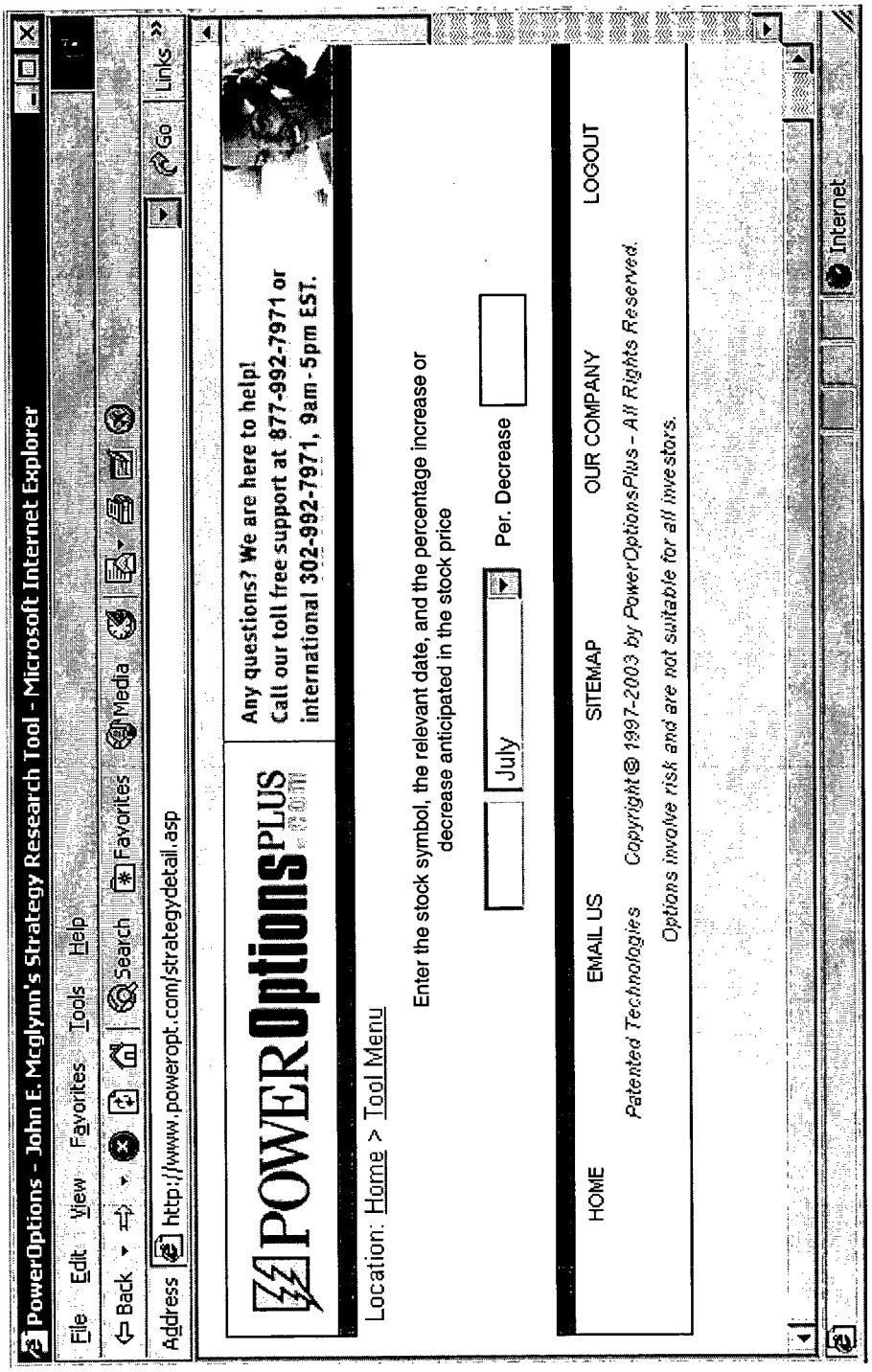
FIG. 11 is a diagram of an exemplary user interface for receiving investor inputs for viewing the effect of a stock movement on option strategies.

Another feature of the exemplary system allows an investor to view the effect of a movement in the price of the underlying stock on the various option strategies. Thus, if an investor believes the price of the underlying stock is going to increase or decrease by a certain percentage or dollar amount, the investor can determine which of the various different option strategies will be most effective in capitalizing on the stock movement. An exemplary screen depicting an interface for a user to input an investor's anticipated stock price movement is shown in FIG. 11. As shown in FIG. 11, an investor identifies the stock, the month by which the change in price is anticipated to take place, and the percentage change in price that is anticipated, including whether the change is positive or negative. In an alternative embodiment, the change in price may be identified in dollars. The data is transmitted to server 100 where it is processed to identify the expected return for instances of various stock option strategies in the case that the stock moves the percentage specified by the investor. The identified change in the price of the stock results in a change in the returns on all of the options as well as the related options strategies. Using an option pricing model such as, for example, the Black-Scholes pricing model, server 100 derives returns for instances of the options and option strategies assuming the appropriate positions are made at the current prices and the price movement identified by the user/investor actually takes place. Instances of the various option strategies that result in a positive return are identified by server 100. Thereafter, server 100 formats and transmits the results to the investor. The data may be transmitted to the investor in a format similar to that depicted in FIGS. 10A-D including the same or similar data items identified for each potential stock option strategy. The user/investor can compare the instances of the various different strategies using the respective returns and risks.

Post-Position Analysis

According to another aspect of the exemplary systems and methods, users with existing positions in a stock or stock strategy can view and analyze different investing alternatives that are available to them given their existing position. For example, an investor with an existing covered call, bull-put credit spread, bear-call credit spread, and/or bear-put debit spread can discover what trading opportunities are available given their current investment position. Generally, options as investment securities have a finite life in the market. Each option contract will eventually come to an expiration data when the owner of that contract will be obligated to either take action on the terms of the contract, or let it expire without action. Since there is a finite time period involved, and because of the market conditions that surround equity option trading, it is important for the investor to keep abreast of what the position is now and can be in the future and possibly change the position to seek less risk or more profit.

The exemplary systems and methods disclosed herein locate potential future trading positions. The post-position feature of the exemplary system allows an investor to obtain an overview of the current value of a multi-security position, the value of that position at expiration (if all other factors remain constant), and potential changes to that position. An investor may wish to obtain a different position for any number of reasons including, for example, the investor's contract may be coming due, or the investor wishes to obtain more profit, or the investor's risk tolerance has changed.

Figure 12:
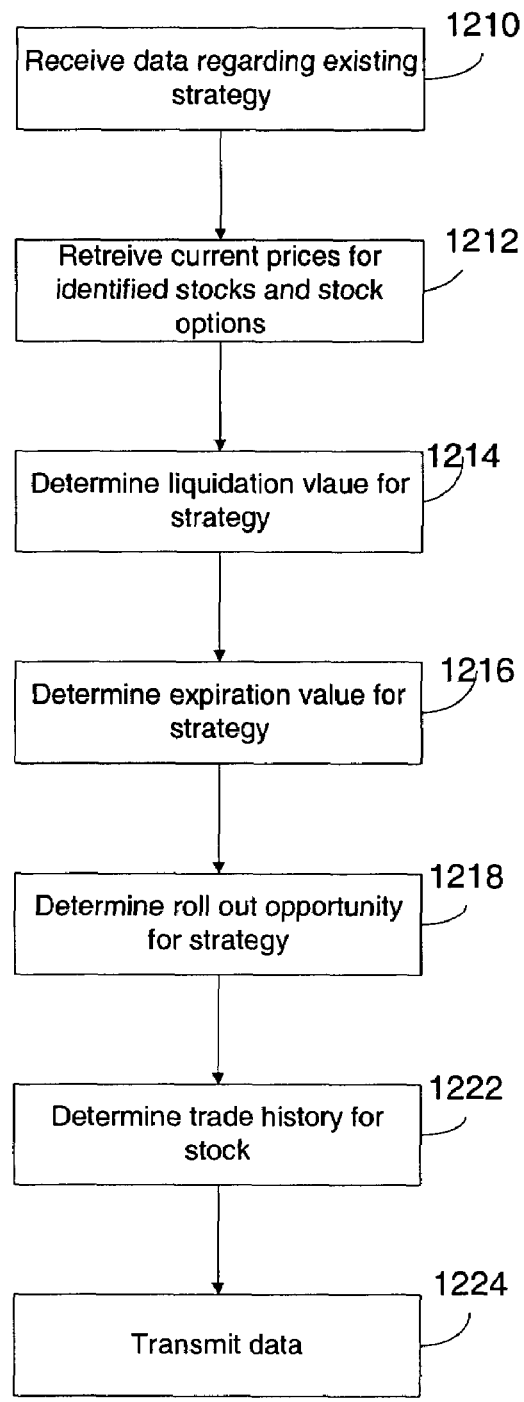
FIG. 12 is a flow chart of a process for presenting investors with potential follow-up investment opportunities.

Referring to FIG. 8, this functionality may be accessed via post-position feature 824. FIG. 12 depicts a flow chart for a process for providing follow-up or post-position analysis. As shown, at step 1210, server 100 receives data regarding an investor's existing option position. For example, and as is depicted in FIG. 13A, an investor with a covered call position might identify the following: the stock that is being held as part of the covered call; the cost of the stock; any commission that was paid in purchasing the stock; the number of shares that were purchased as part of the covered call; the option that is being held as part of the covered call; the price paid for the option; and the amount of commission paid for the option. As depicted in FIG. 13C, an investor with a bear-put debit spread might transmit the following: an identification of the option in which a long position is held; the price paid for each long option contract; the commission paid to establish the long position option contract; the number of options contracts (which is the same for both long and short positions); an identification of the option in which a short position is held; the amount paid to the investor on each short position option contract; and the commission paid on each short position option contract. As depicted in FIG. 13D, an investor with a bear-call credit spread position might transmit the following data outlining the position: an identification of the option in which a long position is held; the price paid for each long position option contract; the commission paid to establish the long position contract; the number of option contracts (which is the same for both long and short positions); an identification of the option in which a short position is held; the price received for each contract in the short position; and the commission paid in creating the short option position. As depicted in FIG. 13E, an investor with a bull-put credit spread might transmit the following data outlining the position: an identification of the option in which a long position is held; the price paid for each long position option contract; the commission paid to establish the long position; the number of option contracts (which is the same for both long and short positions); an identification of the option in which a short position is held; the price received for each contract in the short position; and the commission paid in creating the short option position.

Referring to FIG. 12, at step 1212, server 100 retrieves the current prices for the stocks and option, as well as any other data that is relevant to the option strategy positions identified at step 1210. For example, if at step 1210 a covered call was identified, at step 1212, the current trading price of the stock that is comprised in the covered call strategy and the current trading price of the stock option comprised in the covered call are retrieved. If a bear-put debit spread, bear-call credit spread, or bull-put credit spread were identified at step 1210, at step 1212 the current price of the long and short options comprised in the strategy are retrieved.

At step 1214, server 100 determines the liquidation value of the particular stock option strategy. In other words, server 100 determines the credit or debit that would result if the position was closed out using present market values. For example, and as is depicted in FIG. 13A, for a covered call strategy, server 100 may derives the following: the amount that could be earned for selling the stock underlying the covered call; the cost to purchase the call option that was originally sold as part of the covered call; the combined amount from the sale of the stock and the purchase of the call; and the difference between this combined amount and the cost to originally create the position. As depicted in FIG. 13C, for a bear-put debit spread, server 100 may derive the following: the revenue from the sale of the long option contract that is held as part of the bear-put debit spread; the cost to purchase the short option contract that is held as part of the bear-put debit spread; the combined sum of the revenue from the sale and the cost of the purchase; the original expected profit from the spread which is the original profit that was anticipated from the transaction and can be calculated as the difference in the strike prices of the two options minus the net credit from the disposition of the two options; liquidation profit/loss which is the amount of profit or loss that would result from closing out both sides of the strategy using the current market value, i.e. profit/loss from purchasing the options that were sold and selling the options that were purchased; and the original expected maximum risk which is the highest amount the option strategy can lose and might be calculated as the difference between the premium on the option purchased and the option sold multiplied by the number of shares. As depicted in FIG. 13D, for a bear-call credit spread, server 100 may derive the following: the revenue from the sale of the long option contract that is held as part of the bear-call credit spread; the cost to purchase the short option contract that is held as part of the bear-call credit spread; the combined sum of the revenue from the sale and the cost for the purchase; the original expected profit from the spread which is the original profit that was anticipated from the transaction and can be calculated as the difference in the strike prices of the two options minus the net credit from the disposition of the two options; liquidation profit/loss which is the amount of profit or loss that would result from closing out both sides of the strategy using the current market value, i.e. profit/loss from purchasing the options that were sold and selling the options that were purchased; and the original expected maximum risk which is the highest amount the option strategy can lose and might be calculated as the difference between the premium on the option purchased and the option sold multiplied by the number of shares. As depicted in FIG. 13E, for a bull-put credit spread, server 100 may derive the following: the revenue from the sale of the long option contract that is held as part of the bull-put credit spread; the cost to purchase the short option contract that is held as part of the bull-put credit spread; the combined sum of the revenue from the sale and the cost for the purchase; the original expected profit from the spread which is the original profit that was anticipated from the transaction and can be calculated as the difference in the strike prices of the two options minus the net credit from the disposition of the two options; liquidation profit/loss which is the amount of profit or loss that would result from closing out both sides of the strategy using the current market value, i.e. profit/loss from purchasing the options that were sold and selling the options that were purchased; and the original expected maximum risk which is the highest amount the option strategy can possibly lose and might be calculated as the difference between the premium on the option purchased and the option sold multiplied by the number of shares.

Referring to FIG. 12, at step 1216, server 100 determines the expiration value associated with the stock strategy. In other words, server 100 derives the likely value of the strategy if it is held until expiration. For example, and as is shown in FIG. 13A, for a covered call strategy determining the expiration value may comprise determining the following: whether the call option is out of the money, i.e. the strike price of the option is above the trading price for the underlying stock; if the call option is out of the money, calculating the expiration value for the covered call is zero; if the call option is in the money, calculating the expiration value for the covered call as the sum of the revenue received for the option and the revenue received from the sale of the stock; the cost of the original position; and the difference between the expiration value and the cost of the original position. For a bear-put debit spread strategy, and as depicted in FIG. 13C, determining the expiration value may comprise determining the following: whether the short call option that was sold is in the money; if the short option is in the money, determining the expiration value of the spread to be the revenue or cost associated with reversing the position, i.e. the difference in the revenue received from selling the long position and cost associated with purchasing the short position, minus the fee originally paid; if the short option is out of the money; determining the expiration value of the spread as the original expected net debit. The original net debit is the maximum loss from the position. For a bear-call credit spread, and as is depicted in FIG. 13D, determining the expiration value comprises determining the following: whether the short option contract that was sold is in the money; if the short call option is out of the money, determining the expiration value as the original expected profit, so long as the trading price of the stock is below the strike price of the option; if the short call option is in the money, determining the expiration value of the spread to be revenue or cost associated with reversing the position, i.e. the difference in the revenue received from selling the long position and cost associated with purchasing the short position minus the original net credit. For a bull-put credit spreads, and as is depicted in FIG. 13E, determining the expiration value comprises determining the following: whether the short option contract that was sold is in the money or out of the money; if the short call option is out of the money, determining the expiration value as the original expected profit, so long as the trading price of the stock is below the strike price of the option; if the short call option is in the money, determining the expiration value of the spread to be determining the expiration value of the spread to be revenue or cost associated with reversing the position, i.e. the difference in the revenue received from selling the long position and cost associated with purchasing the short position minus the net credit originally obtained. Once the options go in the money profit is lost. The maximum loss occurs when the stock moves under the lowest strike price. This maximum loss is calculated as the difference in the strike prices minus any net credit originally obtained. For a bull-call debit spread strategy, determining the expiration value may comprise determining the following: whether the short call option that was sold is in the money; if the short option is in the money, determining the expiration value of the spread to be the revenue or cost associated with reversing the position, i.e. the difference in the revenue received from selling the long position and cost associated with purchasing the short position, minus the fee originally paid; if the short option is out of the money; determining the expiration value of the spread as the original expected net debit. The original net debit is the maximum loss from the position.

Referring again to FIG. 12, at step 1218, server 100 identifies potential roll-out opportunities the investor may wish to consider given their existing strategy position. In other words, server 100 identifies potential trade opportunities the investor may wish to consider given his/her existing option strategy position. More particularly, the system searches for option investment opportunities to increase net profit given the existing investment position. For investors with a covered call position, the exemplary system determines if opportunities exist to purchase a stock option to close the existing call option that was sold, and to sell another call option. In one embodiment of the disclosed system, wherein the call option of the covered call is in the money, roll out opportunities are identified where the new option bid price is at least 70% of the buy-back price. Wherein the call option of the covered call is out of the money, roll out opportunities may be identified wherein the new option sale price is at least 50% of the price received for the original option sale. Server 100 searches for call options that satisfy these, or other appropriate criteria, and that result in a net credit or a slight net debit. For each roll out opportunity that is identified, and as is depicted in FIG. 13B, server 100 derives the following: the option symbol; the strike price of the option and strike date; the bid price for the identified option; the net credit realized from the purchase of the original option that was sold and the sale of the new option; the percent downside protection which assumes the underlying stock is not assigned and represents the down side protection based on the sold option premium alone; the percent assigned which represents the downside protection if the underlying stock is assigned; the annualized percent downside protection which is the amount the stock can go down before the investor begins losing money simulated on a yearly basis; the annualized percentage assigned which is the percentage assigned simulated on a yearly basis; and probability above which represents the theoretical chance that an option has of being assigned, i.e. the chance that the stock price will be above/below the strike price of the option.

For investors with bear-put-debit spread positions, at step 1218, server 100 determines if there are bear-call credit spread opportunities for the same underlying stock that result in a positive net credit or a minimal, e.g. less than $1, net debit. If so, server 100 derives data regarding the potential bear-call credit spread opportunity for review by the investor. For example, and as depicted in FIG. 13C, server 100 may derive the following data for each potential bear-call credit spread: an identification of the option to be sold as part of the bear-call credit spread; the strike price and expiration of the option to be sold; the bid price for the option to be sold; the Black Scholes ratio for the option to be sold; an identification of an option to be purchased as part of the bear-call credit spread; the asking price for the option to be purchased; the Black Scholes ratio for the option to be purchased; the percent return for the bear-call credit spread which represents the return on the spread divided by the cost of the spread; the net credit for the bear-call credit spread which represents the difference between the option(s) sold and option(s) bought; the maximum risk which represents the maximum amount that could be lost on the spread strategy, and the probability below which represents the theoretical chance that the option may be assigned, i.e. the chance the stock price will be below the strike price of the option.

For investors with bear-call credit spread positions, at step 1218, server 100 determines if there are bull-put credit spread opportunities for the same underlying stock that result in a positive net credit or a small, e.g. less that $1, debit. If so, server 100 derives data regarding the potential bull-put credit spread opportunity for review by the investor. For example, and as is depicted in FIG. 13D, server 100 may derive the following data for each potential bull-put credit spread: an identification of the option to be sold as part of the bull-put credit spread; the strike price and expiration of the option to be sold; the bid price for the option to be sold; the Black Scholes ratio for the option to be sold; an identification of an option to be purchased as part of the bull-put credit spread; the asking price for the option to be purchased; the Black Scholes ratio for the option to be purchased; the percent return for the bull-put credit spread which represents the amount of money made on the spread divided by the cost of the spread times 100; the net credit for the bull-put credit spread which represents the difference between the option(s) sold and option(s) bought; the maximum risk which represents which represents the maximum amount that could be lost on the spread strategy, and the probability below which represents the theoretical chance that the option may be assigned, i.e. the chance the stock price will be below the strike price of the option.

For investors with bull-put credit positions, at step 1218, server 100 determines if there are bear-call credit spread opportunities for the same underlying stock that result in a positive net credit or a minimal, e.g. less that $1, net debit. If so, server 100 derives data regarding the potential bear-call credit spread opportunity for review by the investor. For example, and as is depicted in FIG. 13E, server 100 may retrieve the following data for each potential bear-call credit spread: an identification of the option to be sold as part of the bear-call credit spread; the strike price and expiration of the option to be sold; the bid price for the option to be sold; the Black Scholes ratio for the option to be sold; an identification of an option to be purchased as part of the bear-call credit spread; the asking price for the option to be purchased; the Black Scholes ratio for the option to be purchased; the percent return for the bear-call credit spread which represents the return on the spread divided by the cost of the spread times 100; the net credit for the bear-call credit spread which represents the difference between the option(s) sold and option (s) bought; the maximum risk which represents the maximum that could be lost on the spread, and the probability below which represents the theoretical chance that the option may be assigned, i.e. the chance the stock price will be below the strike price of the option.

Referring to FIG. 12, at step 1222, server 100 compiles the particular investor's trade history with respect to the stock underlying the particular option strategy that is being analyzed. For example, server 100 reviews each position the particular investor has previously taken to determine if a position may have involved the same stock that underlies the option strategy. Any prior investments involving the underlying stock are compiled into a list for review by the investor.

At step 1224, the data collected and derived at steps 1212 through 1222 are transmitted to the user that made the request for potential trade opportunities. The data may be transmitted as an HTML file that can be displayed in a Web browser. Specifically, the data may be transmitted using screens such as are depicted in FIGS. 13A-E.

Thus, exemplary systems and methods have been disclosed that allow investors with established positions to search for and analyze investment opportunities given their existing position. The exemplary systems and methods derive and present the likely results of liquidating the investor's current position or holding the investor's position until expiration. Furthermore, the exemplary systems and methods derive suggested investment opportunities that result in a positive net credit. While the exemplary systems and methods have been described in connection with covered calls, bear-put debit spreads, bear-call credit spreads, and bull put credit spreads, the systems and methods may be applied to other types of option strategies as well including, for example, covered puts, collars, and calendar LEAP spreads. Furthermore, while specific roll-out strategies have been discussed in connection with particular existing strategies, e.g. a bear call credit roll out to be used with an existing bull put credit spread position, other roll out opportunities might be employed.

Stock Repair

The exemplary systems and methods further provide the capability to identify opportunities to minimize a potential loss on a stock. For example, when an investor has purchased a stock that has fallen in value, it may be possible to get back to a break-even position using an option strategy often referred to as "stock repair." Generally, stock repair refers to a strategy wherein an investor with a position in a stock that has decreased in value sells call options equal to two times the number of shares of the stock that is owned, and covers the additional call options by buying call options at a lower strike price. However, it is not readily determined which stock repair strategies are available and the relative strengths of those stock repair strategies. Likewise, it is not readily determined which potential stock repair strategies can be accomplished for little or no additional costs. The exemplary systems and methods disclosed herein provide functionality to assist investors in identifying these stock repair opportunities.

Figure 14:
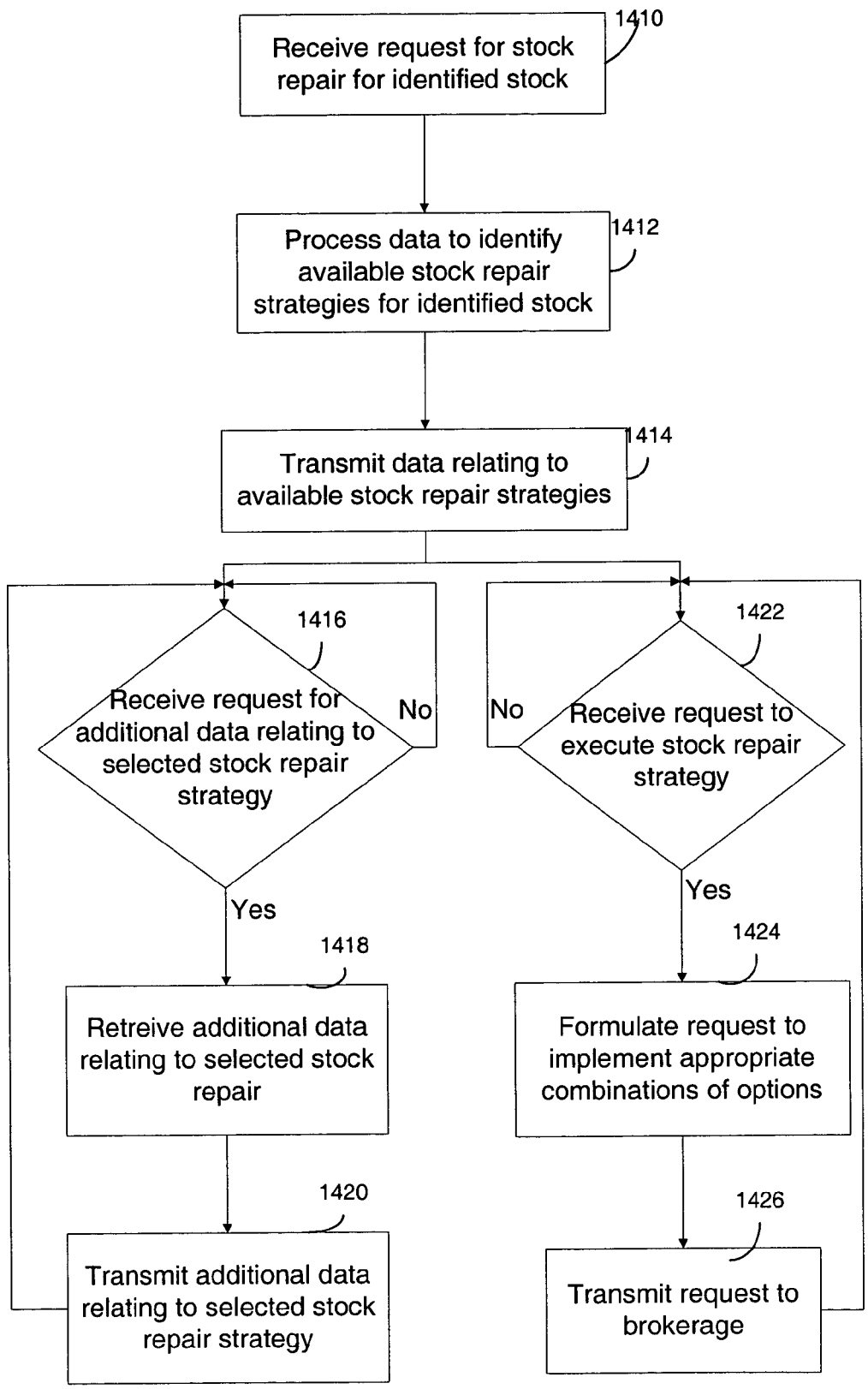
FIG. 14 is a flow chart of a process for performing stock repair.
Figure 15A:
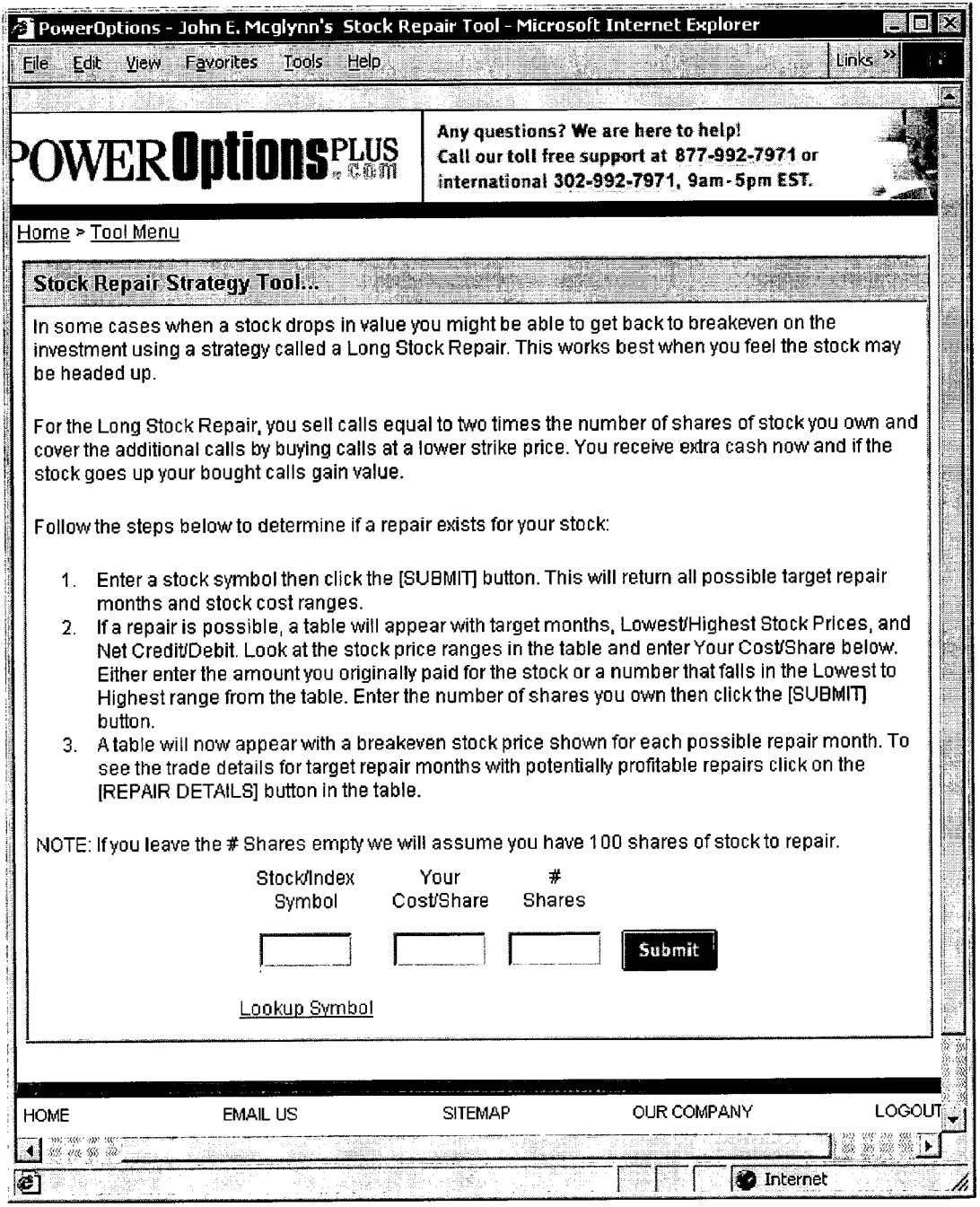
Figure 15B:
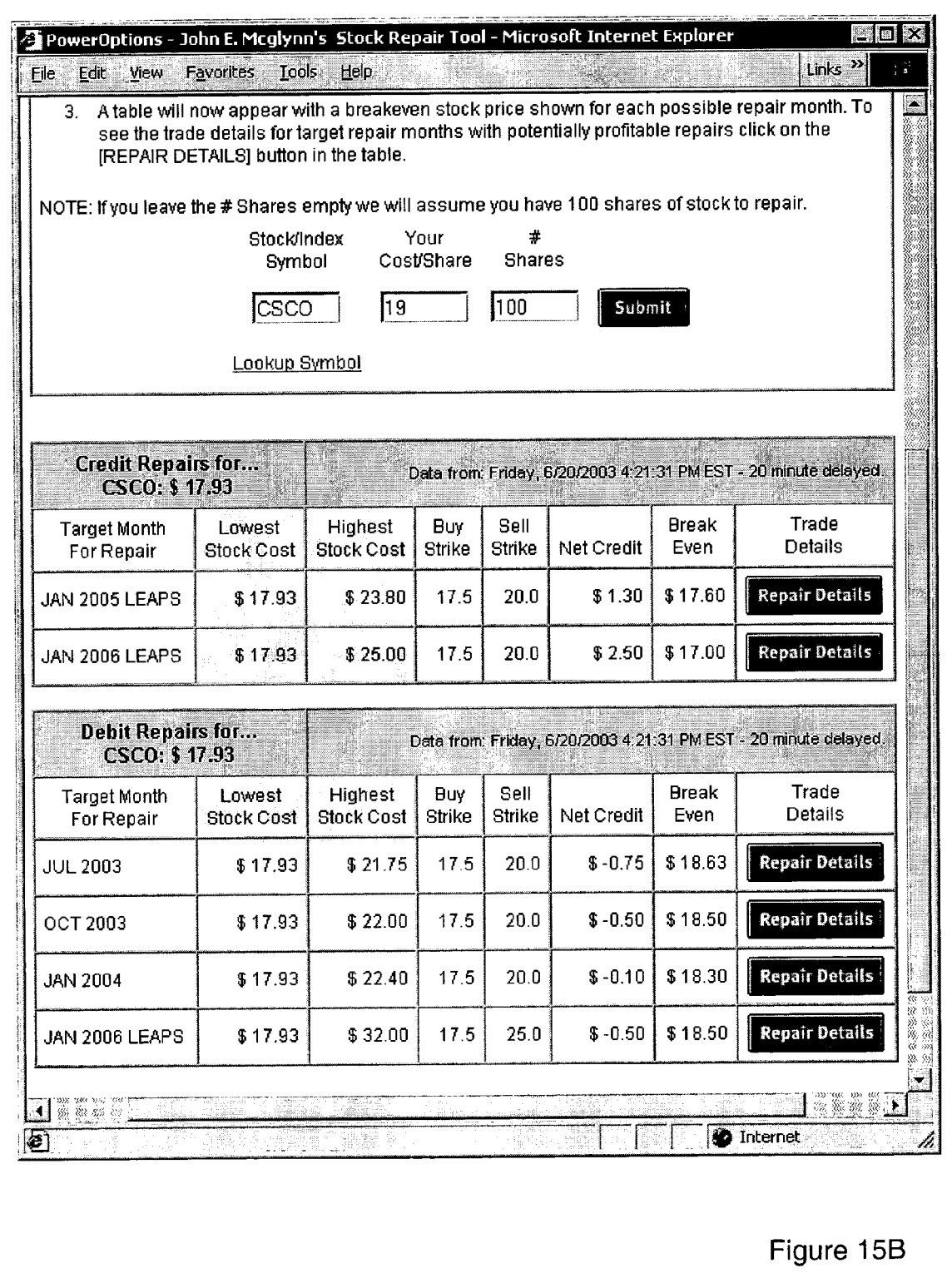

FIG. 14 provides a flow chart of an exemplary process for identifying stock repair opportunities. As shown, at step 1410, server 100 receives a request to identify stock repair opportunities. The request may be formatted by a user employing a screen such as that depicted in FIG. 15A. Generally, the request includes an identification of a stock, the cost per share that was paid for the stock, and the number of shares that are held. At step 1412, server 100 processes the request to identify available stock repair strategies for the identified stock as described below in connection with FIG. 16. Generally, server 100 processes the request to identify stock option repair strategies that can be accomplished with little or no additional costs. At step 1414, server 100 transmits data relating to various stock repair strategies that are available to the user. The data may be formatted as an HTML page for display on a web browser and may be presented in a screen such as is depicted in FIG. 15B. As shown in FIG. 15B, the stock repair strategies may be categorized by those that result in a net credit, i.e. the sale of the call option generates more revenue than the purchase of the call option, and those that result in a net debit. Furthermore, for each stock repair strategy, the data that may be retrieved and transmitted for display may comprise the following: the target month for the repair which is the month the options to be used in the repair expire; the lowest stock cost which is the lowest stock price at which the spread is operative; the highest stock cost which is the highest stock price at which the strategy is operative; the strike price of the purchased call option; the strike price of the sell option; the net credit or debit resulting from the purchase and sale of the call options; and the break even dollar amount which represents the value the underlying stock should be at in order to break even with the proposed stock repair strategy.

Figure 15C:
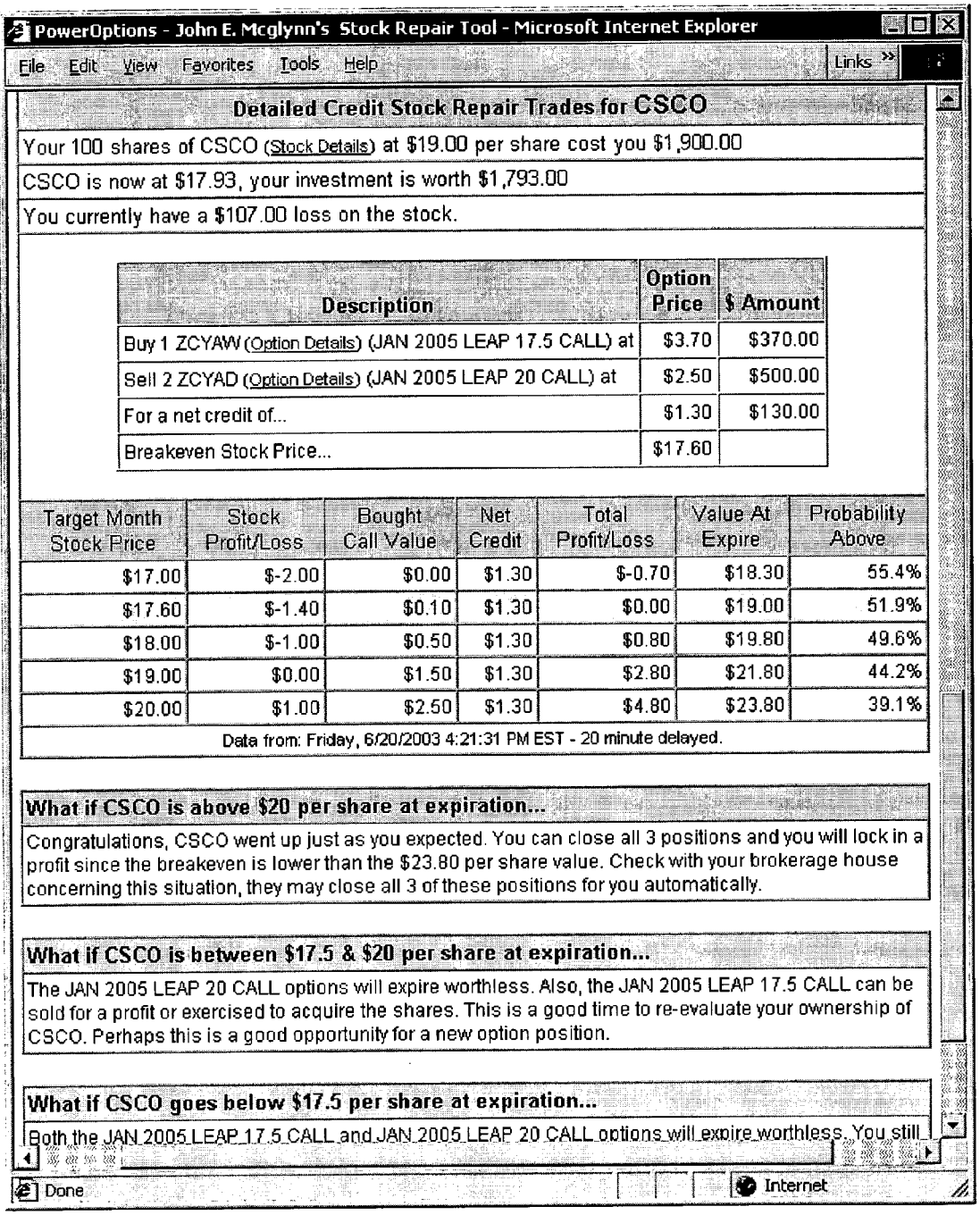

Upon receiving a listing of available stock strategies such as is depicted in FIG. 15B, the user may request additional information regarding particular strategies in the list. Accordingly, at step 1416, server 100 determines if a request for additional information regarding a particular strategy has been received. If not, server 100 continues to monitor for the receipt of such a request. If at step 1416 a request for additional information is received, at step 1418, server 100 retrieves additional data regarding the particular stock repair strategy and at step 1420 transmits the data to the user. For example, data required to fill out a screen such as is depicted in FIG. 15C may be made retrieved and transmitted to the user. As shown in FIG. 15C, the data that may be retrieved and transmitted for display may comprise the following: the cost to purchase the underlying stock; the present value of the underlying stock; the current gain or loss on the stock; the price and total payment for the call option that would be purchased as part of the stock repair strategy; the price and total payment for the call option that would be sold as part of the stock repair strategy; the net credit from the disposition of the call options; and the price of the stock at which the suggested stock repair strategy will break even or result in no loss. The data retrieved and transmitted for display may further comprise a listing of the value of the suggested stock repair strategy, including the total profit/loss if the stock price were to move to different price levels.

A user may also desire to implement a stock repair strategy that has been identified, i.e. to sell the stock option identified as part of the stock repair and to purchase the option that is identified as part of the stock repair. Accordingly, at step 1422, server 100 determines if a request to execute a stock repair strategy is received. Server 100 continues to monitor until and if a request is received. If at step 1422, a request to implement stock repair is received, at step 1424, server 100 formulates a request to purchase the appropriate combination of options. For example, the formulated request may specify the purchase of a call option(s) and the sale of a corresponding option(s). At step 1426, the request is transmitted to a service for execution.

Figure 16:
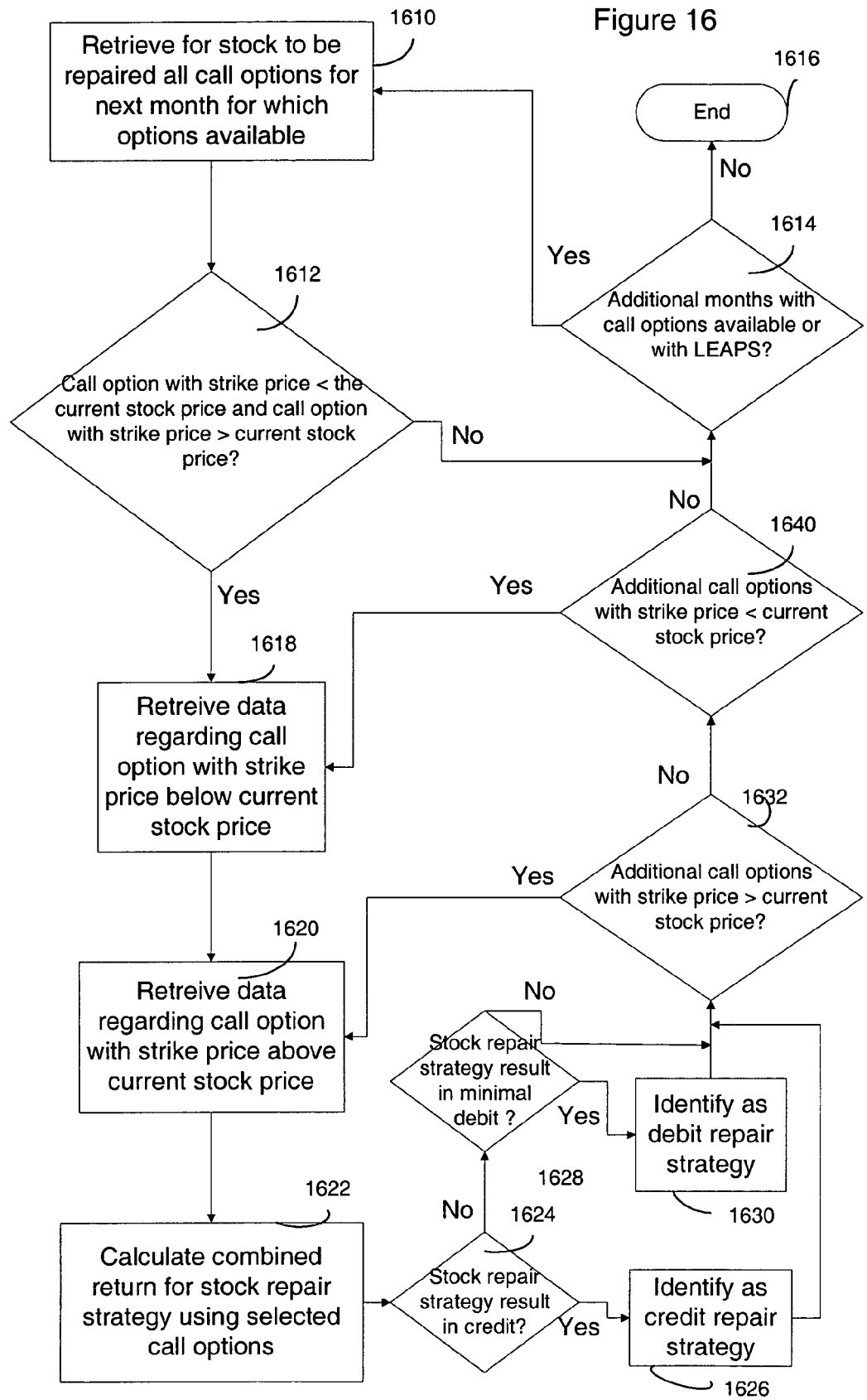
FIG. 16 is a flow chart of a process for identifying potential stock repair strategies.

FIG. 16 provides a flow chart of a process for identifying the stock repair strategies that may be available for a particular stock. As shown, at step 1610, server 100 retrieves for the stock to be repaired all call options for a month for which options are available for the selected stock. At step 1612, server 100 determines if there are any call options with a strike price below the current stock price for the selected stock, and whether there is also available a call option for the selected stock with a strike price greater than the current stock price. If not, at step 1614, server 100 determines if there are additional months with call options or LEAPS available for the selected stock. If so, processing continues at step 1610 with respect to one of those additional months. If at step 1614, there are no additional months having stock options or LEAPS available for the selected stock, processing ends at step 1616.

If at step 1612, it is determined for the designated stock in the particular month that there exists call options with a strike price below the current stock price, and call options with a strike price above the current stock price, processing continues at step 1618. At step 1618, server 100 retrieves data regarding one of the call options with the strike price below the current stock price. At step 1620, server 100 retrieves data regarding one of the call options with the strike price above the current stock price. For example, at steps 1618 and 1620, server 100 may retrieve the strike prices for the options and the revenue or cost associated with selling or purchasing the options. At step 1622, server 100 derives the combined return for the pair of stock options and the dollar amount for the stock at which the call option combination or strategy would result in zero loss to the investor, i.e. the break even point. For example, at step 1622, server 100 may subtract the cost of the purchase of the call option contract with a strike price below the current stock price, from the revenue from the sale of the stock option with a strike price above the current stock price. If a net credit results, the break even point can be determined by subtracting the net credit per stock from the price paid for the underlying stock.

At step 1624, server 100 determines if the calculations showed the particular combination of call options resulted in a net credit. If so, at 1626 the particular combination is identified as a potential stock repair strategy resulting in a net credit. If at step 1624, server 100 determines the calculations showed the particular combination of call options resulted in a net debit, at step 1628, server 100 determines if the net debit is acceptably small. For example, a net debit of $1.00 per option may be an acceptably small debit. Of course, the value of an acceptably small debit may vary. If at step 1628, the debit is acceptably small, at step 1630 the particular combination of call options is identified as a potential stock repair strategy, although with a net debit. The upside to a stock repair with a net debit may be significantly high that an investor may be willing to pay for the potential upside.

Processing continues at step 1632, where it is determined if there are additional call options with a strike price above the current stock price that have not been compared with the particular call option with a strike price below the current stock price. If so, at step 1620 the next call option with a strike price above the current stock price is retrieved, and processing continues as described above at step 1622. If at step 1632, it is determined no other stock options exist with a strike price above the current stock price, processing continues at step 1640.

At step 1640 it is determined whether there are additional call options (other than those that have been previously considered) for the particular month under consideration that have a strike price below the current stock price. If not, processing continues at step 1614 at which it is determined whether options for the particular stock exist in other months. If at step 1640 it is determined that additional call options with strike prices below the current stock price exist, at step 1618 data regarding the next call option with a strike price below the current stock price is retrieved. Thereafter, processing continues at 1620 and each call option with a strike price above the current stock price is compared with the newly identified call option with a strike price below the current stock price. Eventually, the process depicted in FIG. 16 proceeds through all of the call options and LEAPS in all of the months for which they exist for the selected stock. Ultimately, a list is compiled of stock repair strategies that are available to the investor. Referring back to FIG. 14, this list is transmitted to the investor.

Thus, exemplary systems and methods for analyzing and searching financial instrument data have been disclosed. An exemplary system has been disclosed wherein recent market data is reflected in investor search results. According to another aspect of the exemplary systems and methods, different investment strategies can be viewed and analyzed together so that they can be compared and contrasted. Furthermore, the effect on various option strategies of a change in the price of the underlying stock can be analyzed. The disclosed exemplary system also allows for identifying and analyzing potential investment opportunities given an existing trading position. Furthermore, the exemplary systems and methods provide for searching for available stock repair opportunities.

Those skilled in the art understand that computer readable instructions for performing the above described processes and presenting the above described screens, such as those described with reference to FIGS. 4 through 16, can be generated and stored on a computer readable medium such as a magnetic disk or CD-ROM. Further, a computer such as that described with reference to FIG. 2 may be arranged with other similarly equipped computers in a network, and each computer may be loaded with computer readable instructions for performing the above described processes.

While the systems and methods have been described and illustrated with reference to specific embodiments, those skilled in the art will recognize that modification and variations may be made without departing from the principles of the exemplary embodiments as described above and set forth in the following claims. For example, the exemplary embodiments may be applied to gather and sort data related to financial instruments other than stock options. Thus, the disclosed systems and methods could be applied to gather and make accessible financial data related to stocks, bonds, mutual funds, commodities, currencies, indexes, and their derivatives. Accordingly, reference should be made to the appended claims as indicating the scope of the potential embodiments.

What is claimed is:

1. A computer-implemented method of processing user defined requests for financial instrument data, comprising:

at a server computing system receiving financial data from at least one data source, the financial data comprising data corresponding to at least a set of financial instruments;

at the server computing system maintaining the received financial data in a database;

at the server computing system deriving values for a set of searchable parameters corresponding to the set of financial instruments by processing the financial data;

at the server computing system maintaining the derived values for the set of searchable parameters in the database;

at the server computing system receiving user defined search criteria for searching the searchable parameters corresponding to the set of financial instruments;

at the server computing system searching the values derived for the set of searchable parameters for values satisfying the user defined search criteria;

at the server computing system identifying a subset of financial instruments corresponding to values for the set of searchable parameters satisfying the user defined search criteria, the subset of financial instruments representing a subset of the set of financial instruments;

at the server computing system, automatically in response to identifying the subset of financial instruments and prior to transmitting information identifying the subset of financial instruments and values for the set of searchable parameters satisfying the user defined search criteria, requesting updated financial data for the identified subset of financial instruments;

at the server computing system prior to transmitting information identifying the subset of financial instruments and values for the set of searchable parameters satisfying the user defined search criteria, receiving updated financial data for the identified subset of financial instruments in response to the request for updated financial data;

at the server computing system prior to transmitting information identifying the subset of financial instruments and values for the set of searchable parameters satisfying the user defined search criteria, deriving updated values for the set of searchable parameters corresponding to the identified subset of financial instruments by processing the updated financial data; and at the server computing system transmitting information identifying the subset of financial instruments and the updated values for the set of searchable parameters corresponding to the identified subset of financial instruments.

2. The method of claim 1, further comprising at the server computing system ordering the updated values for a set of searchable parameters corresponding to the identified subset of financial instruments.

3. The method of claim 1, wherein requesting updated financial data for the identified subset of financial instruments comprises requesting financial data from a plurality of sources.

4. The method of claim 1, wherein transmitting the updated values for the set of searchable parameters corresponding to the identified subset of financial instruments comprises transmitting data for display by a Web browser.

5. The method of claim 1, wherein the financial instruments are stock options.

6. The method of claim 1, wherein the financial data relates to stocks and stock options.

7. A computer-implemented method of processing user defined requests for financial instrument data, comprising:

at a server computing system receiving financial data from at least one data source, the financial data comprising data corresponding to at least a set of financial instruments;

at the server computing system maintaining the received financial data in a database;

at the server computing system deriving values for a set of searchable parameters corresponding to the set of financial instruments by processing the financial data;

at the server computing system maintaining the derived values for the set of searchable parameters in the database;

at the server computing system identifying a subset of financial instruments from the set of financial instruments having values for the set of searchable parameters satisfying user defined search criteria;

at the server computing system, automatically in response to identifying the subset of financial instruments and prior to transmitting information identifying the subset of financial instruments and values for the set of searchable parameters satisfying the user defined search criteria, requesting updated financial data for the identified subset of financial instruments;

at the server computing system prior to transmitting information identifying the subset of financial instruments and values for the set of searchable parameters satisfying the user defined search criteria, receiving updated financial data for the identified subset of financial instruments in response to the request for updated financial data;

at the server computing system prior to transmitting information identifying the subset of financial instruments and values for the set of searchable parameters satisfying the user defined search criteria, deriving updated values for the set of searchable parameters corresponding to the identified subset of financial instruments by processing the updated financial data; and at the server computing system transmitting the updated values for the set of searchable parameters corresponding to the identified subset of the set of financial instruments.

8. The method of claim 7, further comprising at the server computing system receiving the user defined search criteria for searching the searchable parameters corresponding to the financial instruments.

9. The method of claim 7, wherein the financial instruments are stock options.

10. A computer readable storage medium having instructions stored thereon that, if executed by a server computing system, cause the computing system to perform operations comprising:

at the server computing system receiving financial data from at least one data source, the financial data comprising data corresponding to at least a set of financial instruments;

at the server computing system maintaining the received financial data in a database;

at the server computing system deriving values for a set of searchable parameters corresponding to the set of financial instruments by processing the financial data;

at the server computing system maintaining the derived values for the set of searchable parameters in the database;

at the server computing system receiving user defined search criteria for searching the searchable parameters corresponding to the set of financial instruments;

at the server computing system searching the values derived for the set of searchable parameters for values satisfying the user defined search criteria;

at the server computing system identifying a subset of financial instruments corresponding to values for the set of searchable parameters satisfying the user defined search criteria, the subset of financial instruments representing a subset of the set of financial instruments;

at the server computing system, automatically in response to identifying the subset of financial instruments and prior to transmitting information identifying the subset of financial instruments and values for the set of searchable parameters satisfying the user defined search criteria, requesting updated financial data for the identified subset of financial instruments;

at the server computing system prior to transmitting information identifying the subset of financial instruments and values for the set of searchable parameters satisfying the user defined search criteria, receiving updated financial data for the identified subset of financial instruments in response to the request for updated financial data;

at the server computing system prior to transmitting information identifying the subset of financial instruments and values for the set of searchable parameters satisfying the user defined search criteria, deriving updated values for the set of searchable parameters corresponding to the identified subset of financial instruments by processing the updated financial data; and at the server computing system transmitting information identifying the subset of financial instruments and the updated values for the set of searchable parameters corresponding to the identified subset of financial instruments.

11. The computer readable storage medium of claim 10, having instructions stored thereon that, if executed by a server computing system, cause the computing system to perform operations comprising:

at the server computing system ordering the updated values for a set of searchable parameters corresponding to the identified subset of financial instruments.

12. The computer readable storage medium of claim 10, wherein requesting updated financial data for the identified subset of financial instruments comprises requesting financial data from a plurality of sources.

13. The computer readable storage medium of claim 10, wherein transmitting the updated values for the set of searchable parameters corresponding to the identified subset of financial instruments comprises transmitting data for display by a Web browser.

14. The computer readable storage medium of claim 10, wherein the financial instruments are stock options.

15. The computer readable storage medium of claim 10, wherein the financial data relates to stocks and stock options.

16. A system for processing user defined requests for financial instrument data, comprising:

a computing processor;

a computing storage memory communicatively coupled to the computing processor, the computing storage memory having instructions stored thereon that, if executed by the computing processor, cause the computing processor to perform operations comprising:

receiving financial data from at least one data source, the financial data comprising data corresponding to at least a set of financial instruments;

maintaining the received financial data in a database;

deriving values for a set of searchable parameters corresponding to the set of financial instruments by processing the financial data;

maintaining the derived values for the set of searchable parameters in the database;

receiving user defined search criteria for searching the searchable parameters corresponding to the set of financial instruments;

searching the values derived for the set of searchable parameters for values satisfying the user defined search criteria;

identifying a subset of financial instruments corresponding to values for the set of searchable parameters satisfying the user defined search criteria, the subset of financial instruments representing a subset of the set of financial instruments;

automatically in response to identifying the subset of financial instruments and prior to transmitting information identifying the subset of financial instruments and values for the set of searchable parameters satisfying the user defined search criteria, requesting updated financial data for the identified subset of financial instruments;

prior to transmitting information identifying the subset of financial instruments and values for the set of searchable parameters satisfying the user defined search criteria, receiving updated financial data for the identified subset of financial instruments in response to the request for updated financial data;

prior to transmitting information identifying the subset of financial instruments and values for the set of searchable parameters satisfying the user defined search criteria, deriving updated values for the set of searchable parameters corresponding to the identified subset of financial instruments by processing the updated financial data; and transmitting information identifying the subset of financial instruments and the updated values for the set of searchable parameters corresponding to the identified subset of financial instruments.

17. The system of claim 16, said computing storage memory having instructions stored thereon that, if executed by the computing processor, cause the computing processor to perform operations comprising:

ordering the updated values for a set of searchable parameters corresponding to the identified subset of financial instruments.

18. The system of claim 16, wherein requesting updated financial data for the identified subset of financial instruments comprises requesting financial data from a plurality of sources.

19. The system of claim 16, wherein transmitting the updated values for the set of searchable parameters corresponding to the identified subset of financial instruments comprises transmitting data for display by a Web browser.

20. The system of claim 16, wherein the financial instruments are stock options.

21. The system of claim 16, wherein the financial data relates to stocks and stock options.

* * * * *